United States Patent
Liu et al.

(10) Patent No.: US 12,332,926 B2
(45) Date of Patent: Jun. 17, 2025

(54) UNIT PREDICTION FOR CUSTOM FEATURE ENGINEERING

(71) Applicant: Fujitsu Limited, Kawasaki (JP)

(72) Inventors: Lei Liu, Sunnyvale, CA (US); Yinlin Deng, Sunnyvale, CA (US); Mehdi Bahrami, Santa Clara, CA (US); Mukul R. Prasad, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 281 days.

(21) Appl. No.: 17/988,651

(22) Filed: Nov. 16, 2022

(65) Prior Publication Data

US 2024/0160646 A1 May 16, 2024

(51) Int. Cl.
  *G06F 16/3329*    (2025.01)
  *G06F 16/355*    (2025.01)

(52) U.S. Cl.
  CPC ........ *G06F 16/3329* (2019.01); *G06F 16/355* (2019.01)

(58) Field of Classification Search
  CPC .......................... G06F 16/3329; G06F 16/355
  See application file for complete search history.

(56) References Cited

U.S. PATENT DOCUMENTS

| | | | | |
|---|---|---|---|---|
| 2020/0218745 A1* | 7/2020 | Filoti | ................. | G06F 16/3329 |
| 2021/0082425 A1* | 3/2021 | Johnson | ................... | G06N 5/04 |
| 2022/0027362 A1* | 1/2022 | Tierney | .............. | G06F 16/3329 |
| 2024/0038226 A1* | 2/2024 | Nouri | ..................... | G06F 40/35 |

OTHER PUBLICATIONS

Nargesian et al. "Learning Feature Engineering for Classification" Aug. 2017.
Wang et al. "Leveraging Transitive Relations for Crowdsourced Joins" 2013.
Luo et al. "AutoCross: Automatic Feature Crossing for Tabular Data in Real-World Applications" Aug. 2019.
Shi et al. "SAFE: Scalable Automatic Feature Engineering Framework for Industrial Tasks" Mar. 2020.
Horn et al. "The autofeat Python Library for Automated Feature Engineering and Selection" Feb. 2020.
Franzi et al. "Linear Prediction Models with Automated Feature Engineering and Selection" Oct. 28, 2021.

(Continued)

*Primary Examiner* — Bhavesh M Mehta
*Assistant Examiner* — Edward Tracy, Jr.
(74) *Attorney, Agent, or Firm* — Maschoff Brennan

(57) ABSTRACT

A method may include obtaining a dataset that may include at least a first column and a second column, with a first title and a first value and a second title and a second value, respectively. The operations may further include determining a total similarity value between the first and second columns based on a metadata similarity value, a semantic similarity value, and/or a unit of measurement similarity value; adding the first and second columns to a cluster if the total similarity value is less than a threshold value; generating a new column to add to the cluster using a feature engineering function, where the new column may include a new title and a new value, the new value determined using the feature engineering function by acting on the first value and/or the second value. Further, the operations may include adding the new column to the dataset.

17 Claims, 11 Drawing Sheets

(56) References Cited

OTHER PUBLICATIONS

Chen et al. "Neural Feature Search: A Neural Architecture for Automated Feature Engineering" 2019.
Suhara et al. "Annotating cols. with Pre-trained Language Models" Apr. 2021.
Geva et al. "Injecting Numerical Reasoning Skills into Language Models" Apr. 2020.
Wallace et al. "Do NLP Models Know Numbers? Probing Numeracy in Embeddings" Sep. 2019.
Soares et al. "Matching the Blanks: Distributional Similarity for Relation Learning" 2019.
Chen et al. "TABFACT: A Large-Scale Dataset for Tablebased Fact Verification" Jun. 2020.
Herzig et al. "TAPAS: Weakly Supervised Table Parsing via Pre-training" Jul. 2020.
European Search Report dated Mar. 4, 2024 as received in application No. 23208719.7.
Korn et al., "Automatically Generating Interesting Facts from Wikipedia Table" Jul. 30, 2019.

\* cited by examiner

UNIT PREDICTION FOR CUSTOM FEATURE ENGINEERING

FIELD

The embodiments discussed in the present disclosure are related to unit prediction for custom feature engineering (PE).

BACKGROUND

Unless otherwise indicated in the present disclosure, the materials described in the present disclosure are not prior art to the claims in the present application and are not admitted to be prior art by inclusion in this section.

Machine learning systems may be used in many technology sectors including but not limited to financial technologies, eCommerce, social media, gaming, facial recognition, and autonomous driving. These machine learning systems may be able to receive an input that may allow the system to learn and adapt to different sets of circumstances. In many cases, the input that the machine learning system may be able to receive may be a set or sets of data.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One or more embodiments of the present disclosure may include a method. The method may include obtaining a dataset that may include at least a first column and a second column, and where the first column may include a first title and a first value and the second column may include a second title and a second value. Additionally, the method may include determining a total similarity value between the first column and the second column which may be based on at least one of a metadata similarity value, a semantic similarity value, and a unit of measurement similarity value. The method may additionally include adding the first column and the second column to a cluster if the total similarity value is less than a threshold value. Further, the method may include generating a new column to add to the cluster that may be done by using a feature engineering function, where the new column may include a new title and a new value, the new value may be determined by using the feature engineering function by acting on at least one of the first value of the first column and the second value of the second column. Additionally, the method may include, adding the new column to the dataset.

One or more embodiments of the present disclosure may include a method. The method may include obtaining a dataset having one or more columns, each of the one or more columns may include a title and at least one value. The method may additionally include extracting, for each of the one or more columns, the title and a sample value from the at least one value. Furthermore, the method may include, synthesizing a question based on the title and the sample value for each of the one or more columns. The method may additionally include, sending the question to a language model to obtain an answer; and further, the method may include, generating from the answer to the question, a predicted unit of measurement for the at least one value in each of the one or more columns.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DETAILED DESCRIPTION

Figure 1:
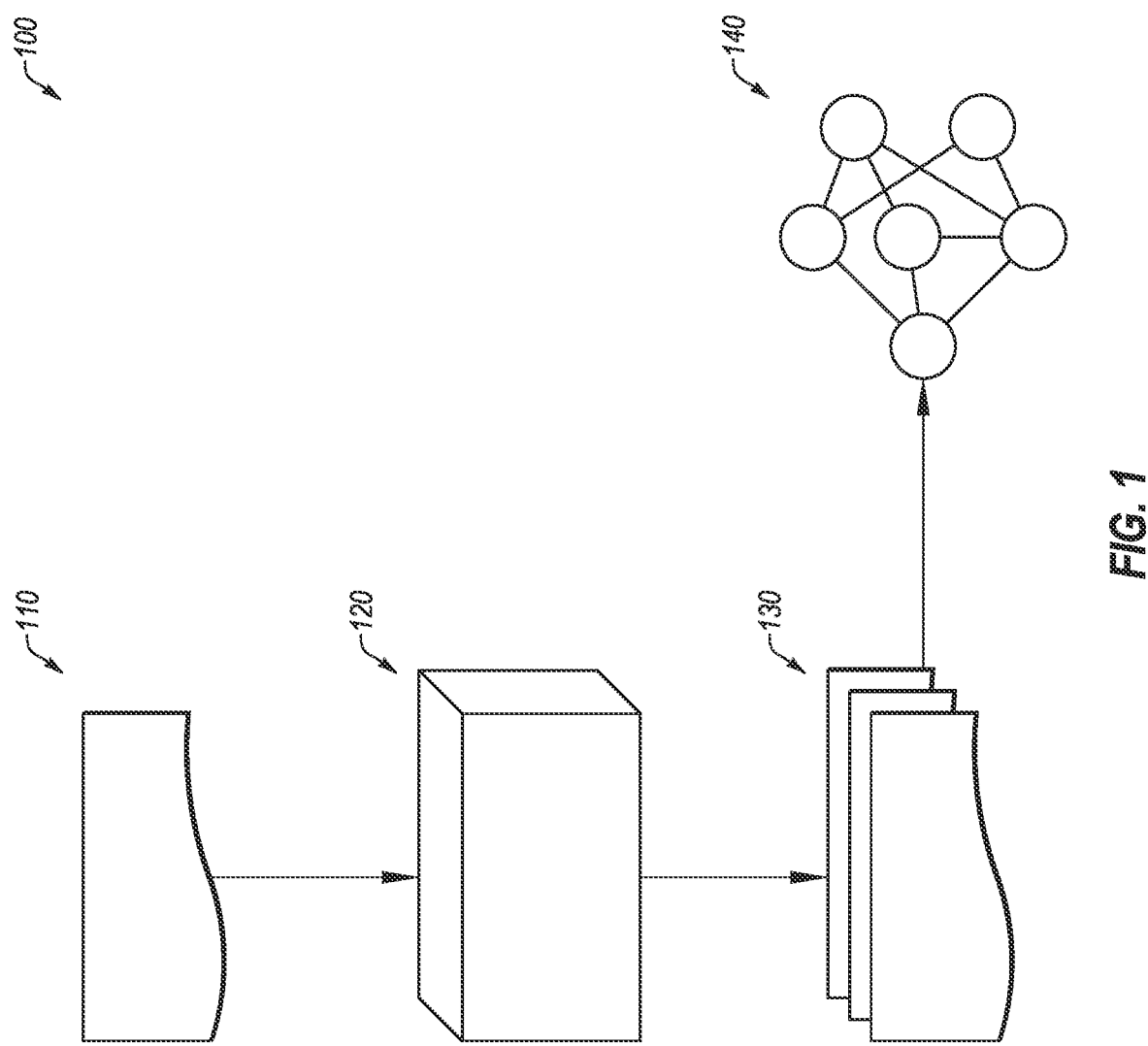
FIG. 1 illustrates an example embodiment of a system that can utilize automated custom feature engineering.

Machine learning systems and algorithms are increasingly used in a number of technology areas using artificial intelligence and particularly in tasks involving prediction. Developing machine learning systems and algorithms to comport with a number of applications has become increasingly more difficult and expensive. Machine learning system development may be time consuming and may include a large number of man hours and professional expertise from data scientists and others to prepare datasets associated with the machine learning systems. These datasets may be used in training machine learning systems to perform a specific task.

A useful tool in developing datasets used to train machine learning systems may be feature engineering. The present disclosure relates to feature engineering and functions designed to use feature engineering. For example, feature engineering may refer to any number of operations, such as mathematical operations, that may be designed to expand, contract, clean, filter, or clarify data within a given dataset. Some example operations associated with or implementations of feature engineering may include feature selection, feature extraction, and/or feature construction.

A feature, as used in the context of feature engineering in the present disclosure, may refer to a unique attribute or variable in a dataset. Features may be contextualized in a dataset as a single column within the dataset.

Feature selection may include a process whereby redundancy in a dataset is reduced by removing one or more redundant features in the dataset.

Feature extraction may include a process whereby the dimensionality of features in a given dataset may be reduced by combining, displaying, or otherwise manipulating the data such that fewer variables are used. For example, the dimensionality of features in the dataset may be reduced by using a mapping function to identify one or more variables that may be removed or combined with another variable. For example, a principal component analysis (PCA) mapping function may be used to identify the principal components of the dataset and may extract that data in a way that may be visualized or illustrated with fewer variables.

Feature construction may refer to the expansion of existing features in the dataset to include other features that may not have been originally listed. Feature construction may include using mathematical functions (such as addition, subtraction, division, multiplication, combinations thereof, or others) that may be performed on two or more features such that a new feature may be created and added to the dataset. The dataset, including the new feature or column added to the dataset may be used to train the machine learning system such that the performance of the machine learning system may improve.

While feature engineering may be a tool used to improve datasets, the process of performing feature engineering may be expensive. Current automated machine learning algorithms and systems may have difficulty on their own in identifying relevant features, comparing those relevant features, and creating new features that may improve the dataset via feature engineering. Therefore, manual avenues may be those typically taken to perform feature engineering on datasets, including large datasets.

For example, feature engineering may typically be performed by experienced data scientists who may add features to a dataset, remove feature redundancy in the dataset, and/or who may reduce dimensionality within the dataset. Furthermore, datasets that may be used to train machine learning systems may be large (e.g., on the order of thousands or millions of data points, or more). Indeed, many applications for machine learning may be benefited by training such machine learning systems with large datasets which, in turn, may require more time, more professional expertise, and more money to apply feature engineering functions that may create more effective datasets that may be used to train the machine learning systems.

Some embodiments described in the present disclosure may substantially decrease the cost (e.g., computing, human, and/or monetary costs) associated with training machine learning systems by disclosing a method and system capable of performing feature engineering processes to create new features such that the dataset may be better suited to train machine learning systems. For example, the method and system described in the present disclosure may find a similarity between features in a dataset, cluster similar features in the dataset based on the similarity between features in the dataset, generate new features, add the new features to the dataset, eliminate redundant or irrelevant features from the dataset, and/or use the dataset, including the new features, to train a machine learning system that may be designed to perform a task.

According to one or more embodiments of the present disclosure, a system designed to implement the method or methods as described below may generate and add at least one new feature to the dataset. Additionally or alternatively, the dataset may be used to train a machine learning system to perform a given task. Further, the dataset, including the at least one new feature generated by the system and added to the dataset, may be used in a machine learning pipeline that may be designed to train a number of machine learning systems and/or machine learning algorithms.

According to one or more embodiments of the present disclosure, adding the at least one new feature may improve the dataset by including an additional amount of information that may not be present in the dataset without the at least one new feature. Additionally or alternatively, the at least one new feature in the dataset may include context that may further explain another feature in the dataset. For example, a dataset may include a first feature "quick" and a second feature "100 mph." Further continuing the example, the feature engineering function may combine the first feature and the second feature which may generate a third feature where "100 mph" may provide further context for "quick" in the dataset. In these and other embodiments, the additional context may provide a correlation between features. For example, a first feature "quick" and a second feature "fast" may each be combined with a third feature "100 mph" and a fourth feature "200 mph" respectively generating a fifth and sixth feature. Further continuing the example, the generated fifth and sixth features may provide a correlation between the first feature "quick" and the second feature "fast" that may not have otherwise been expressed in the dataset. In some embodiments, a machine learning system or algorithm trained using the dataset including the at least one new feature, may have an increased predictive accuracy and/or efficiency compared to a machine learning system trained using the dataset without the at least one new feature. Additionally or alternatively, the dataset that may include the at least one new feature may include fewer redundant features, which may increase the speed with which a machine learning system may be trained and may reduce overfitting by reducing noisy and less important features. In some embodiments, the use of the described principles and/or operations for predicting a unit of measurement for a given feature may provide the described benefit. For example, by providing a predicted unit of measurement for a given feature, the machine learning system may be better able to perform the task to which the machine learning system is assigned (e.g., may be more accurate and/or faster in performing its task). Overall, in some circumstances, the performance of the machine learning system may improve by using the methods and systems of the present disclosure and/or the new dataset created by such methods and systems. Additionally, a performance of a machine learning pipeline, where the machine learning pipeline may be designed to train any number of machine learning systems and/or algorithms, may improve by using one or more principles of the present disclosure and/or the new dataset created in embodiments of the present disclosure.

These and other embodiments of the present disclosure will be explained with reference to the accompanying figures. It is to be understood that the figures are diagrammatic and schematic representations of such example embodiments, and are not limiting, nor are they necessarily drawn to scale. In the figures, features with like numbers indicate like structure and function unless described otherwise.

FIG. 1 illustrates an example embodiment of a system 100 that can utilize a feature engineering function (such as automated custom feature engineering), in accordance with at least one embodiment described in the present disclosure. The system 100 may include a dataset 110, a feature engineering system 120, a new dataset 130, and a machine learning system 140.

The dataset 110 may include values that may be representative of a given feature. The values representative of the given feature may be organized into column(s). In some embodiments, the dataset 110 may include a number of columns where each column may include a title and any number of values. For example, if the dataset included information regarding homes, the title of the first column may be "total square feet" and each of the values may represent the "total square feet" of the corresponding home for that entry in the dataset. In some embodiments, the columns in the dataset 110 may each represent a distinct or different feature in the dataset 110. For example, the dataset 110 may include a first column that may represent a first feature and the dataset 110 may further include a second column which may represent a second feature. In some embodiments, features within a dataset may be used as an input variable in a feature engineering function. In these and other embodiments, the input variable in the feature engineering function may be represented by a given "column" in the dataset where the values in the given column may share one or more properties or characteristics consistent with each other. While the example of columns is utilized, it will be appreciated that any other data storage or representation approach may be undertaken, such as by storing the data associated with the feature in rows, arrays, vectors, or any other approach.

In some embodiments, the values in each of the columns may be the same data type or may be a different data type. For example, each of the values in each of the columns of the dataset 110 may be integers. As another example, each of the values in each of the columns of the dataset 110 may be strings. As an additional example, the values in a first column in the dataset 110 may be strings and the values in a second column in the dataset 110 may be integers. In some embodiments, a given column in the dataset 110 may include different data types. In these and other embodiments, the values of the dataset 110 may include integers, floating points, strings, characters, and/or any other data types.

In these and other embodiments, the dataset 110 may be stored in a comma separated values file type ("CSV"), Hierarchical Data Format ("HDF"), Java Script Object Notation ("JSON"), Text File ("TXT"), Structured Query Language ("SQL") Database, or any other file type that may allow for the columns and the values in the dataset 110 to be stored and organized. In these and other embodiments, the dataset 110 may be received by the feature engineering system 120.

The feature engineering system 120 may include any system, apparatus, or device configured to receive the dataset 110 and generate a new column to add to the dataset 110 based on at least one of the values in the dataset 110. In some embodiments, the feature engineering system 120 may include a feature engineering function designed to determine a similarity between values in a first column and values in a second column. Additionally or alternatively, based on a determination that the values in the first column are similar to the values in the second column, the feature engineering function may generate new values in a new column. In some embodiments, the feature engineering function may generate new values in the new column by performing a mathematical operation on one or more of the values in the first column and/or one or more of the values in the second column. Additionally or alternatively, the feature engineering system 120 may add the new column including the new values to the dataset 110. In such a circumstance, the updated dataset with the new column may be referred to as a new dataset 130.

In some embodiments, the feature engineering function 120 may eliminate columns from the dataset 110 when forming the new dataset 130. For example, the feature engineering system 120 may determine that the values in the first column and the values in the second column may be redundant of each other and, in response, the feature engineering system 120 may remove the second column from the dataset 110.

In some embodiments, the new dataset 130 may include the original dataset 110 and the new column that may have been generated by the feature engineering function by the feature engineering system 120. In some embodiments, the new dataset 130 may include any number of new columns added by the feature engineering system 120 to the dataset 110. In these and other embodiments, each of the new columns may be generated by a different feature engineering function. In some embodiments, the new dataset 130 may include fewer columns than in the original dataset 110. For example, by removing redundancy, the new dataset 130 may include fewer columns than the original dataset 110.

In some embodiments, the new dataset 130 may not include all of the columns from the original dataset 110 (e.g., one or more columns may have been removed) and may include one or more new columns that may have been added to the dataset 110 by the feature engineering system 120. For example, the dataset 110 may include a first column with first values, a second column with second values, a third column with third values, and a fourth column with fourth values. Continuing the example, the feature engineering system 120 may remove both the third and the fourth columns because the third values and the fourth values may be redundant in light of the first values and the second values. Further continuing the example, the feature engineering system may additionally have generated a new column with new values based on a comparison between the first values in the first column and the second values in the second column. Continuing the example, the feature engineering system 120 may add the new column to the dataset 110 such that the new dataset 130 includes three columns (one fewer than the original dataset 110) that include the new column generated by the feature engineering system 120.

In some embodiments, the feature engineering system 120 may be designed to send the new dataset 130 to a machine learning system 140.

The machine learning system 140 may be any suitable system, apparatus, or device configured to utilize a dataset to be trained to perform a given task. In some embodiments, the machine learning system 140 may be configured to receive the new dataset 130 from the feature engineering system 120. In some embodiments, the new dataset 130 may be used to train the machine learning system 140 to complete the given task. In some embodiments, the given task may include making a prediction, identifying relationships, or any other task.

As an example, the machine learning system 140 may include an algorithm configured to predict prices of residential homes. In this example, the machine learning system 140 may receive the dataset 110 that may have a first column with values that represent "location" and a second column with values that represent "last sale price." The dataset 110 may be used to train the machine learning system 140 to perform its target function of predicting a price of a given residential home based on other data such as the location and the last sale price.

In another example, the machine learning system 140 may include an algorithm configured to predict prices of residential homes. Continuing the example, the machine learning system 140 may receive the new dataset 130 that may have the first column with values that represent "location" and the second column with values that represent "last sale price" as illustrated in the above example with respect to the dataset 110. Additionally, the new dataset 130 may include a third column with values that may represent "square footage," and a fourth column with values that may be generated by the feature engineering system representative of a "price per square foot." The new dataset 130 may be used to train the machine learning system 140 to predict a price of a given residential home. Further continuing the example, because the additional feature, "price per square footage," may have been added to the dataset 110 by the feature engineering system 120 when generating the new dataset 130, the machine learning system 140 that receives the new dataset 130 may be able to predict a price of a given residential home with more accuracy than if the machine learning system 140 had been trained with the original dataset 110.

Modifications, additions, or omissions may be made to the system 100 without departing from the scope of the disclosure. For example, the designations of different elements in the manner described is meant to help explain concepts described herein and is not limiting. Further, the system 100 may include any number of other elements or may be implemented with other systems or environments than those described.

Figure 2:
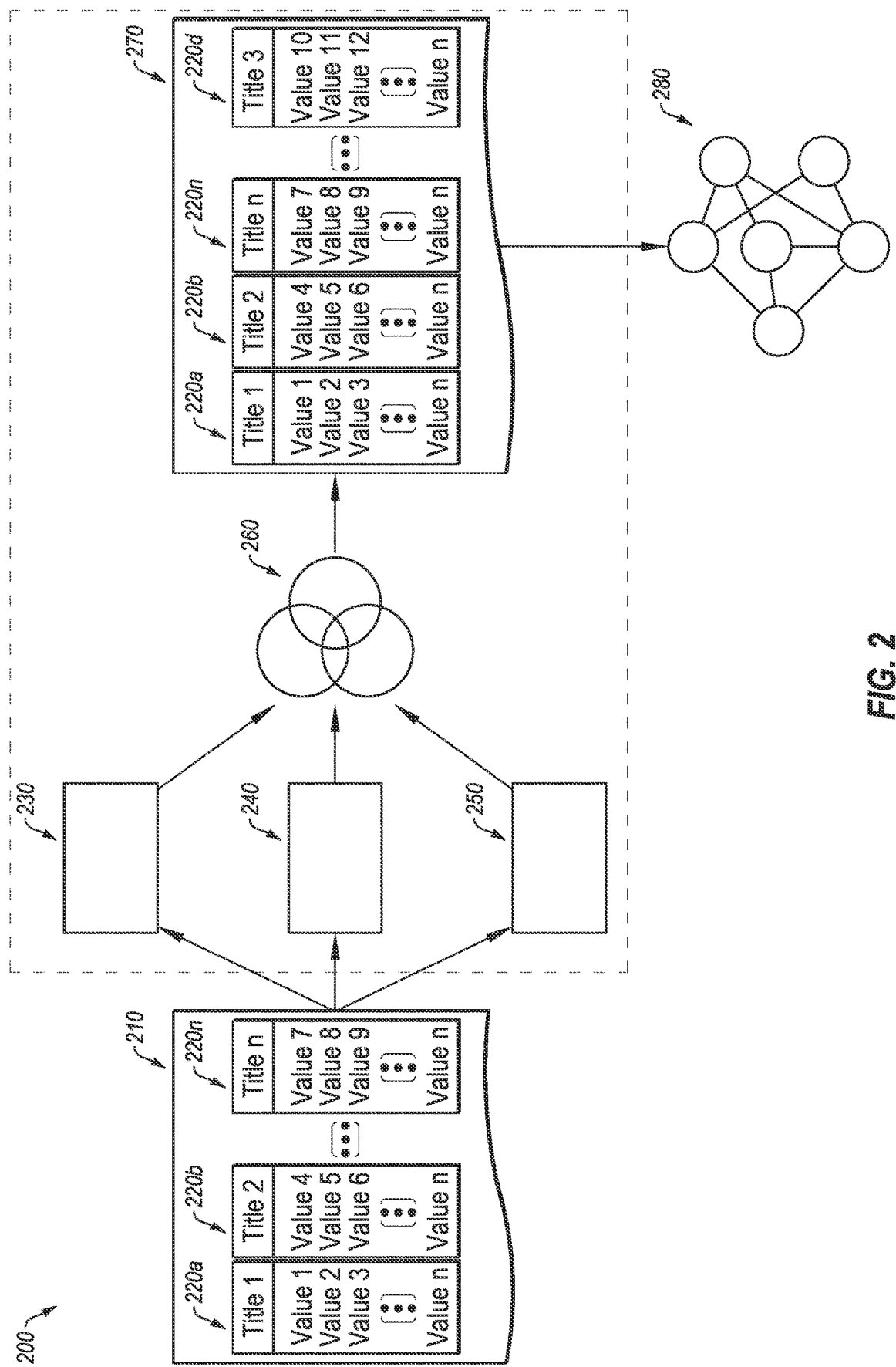
FIG. 2 illustrates an example embodiment of a system configured to generate a number of new columns to add to a dataset.

FIG. 2 illustrates an example embodiment of a system 200 configured to generate a number of new columns to add to a dataset 210, in accordance with at least one embodiment described in the present disclosure. The system 200 may include the dataset 210 which may include a number of columns including a first column 220*a*, a second column 220*b* up to an nth column 220*n* (collectively "the columns 220"). The system 200 may be configured to receive the dataset 210 and may additionally include a metadata similarity module 230, a semantic similarity module 240, and a unit similarity module 250. The system 200 may further include a cluster module 260. The system 200 may additionally include a new dataset 270 which may include the first column 220*a*, the second column 220*b* up to the nth column 220*n* with at least one new column 220*d* generated by the system 200. The system 200 may additionally be configured to send the new dataset 270 to a machine learning system 280.

The dataset 210 may include the first column 220*a*, the second column 220*b* up to the nth column 220*n*. The first column 220*a* may include a first title and first values, the second column 220*b* may include a second title and second values, and the nth column may include an nth title and nth values.

In some embodiments, the first title of the first column 220*a* may be the same as the second title of the second column 220*b* and the same as the nth title of the nth column 220*n*. Additionally or alternatively, the first title of the first column 220*a* may not be the same as the second title of the second column 220*b* and the first title of the first column 220*a* may not be the same as the nth title of the nth column 220*n*.

In these and other embodiments, the values in a given column may relate to the title of the column. For example, the title of a given column may be "price per square foot" and the values in the given column may include values that relate back to the title "price per square foot," such as [[100 125 140.70]] and/or other values that may be commensurate with the title.

In some embodiments, the system 200 may compare the columns 220 to determine whether the columns 220 may be similar. For example, the first column 220*a* may be compared to the second column 220*b*, the nth column 220*n*, or any other column. In some embodiments, any number of columns may be compared with each other, such as the first column 220*a* being compared to both the second column 220*b* and the nth column 220*n*.

In some embodiments, a total similarity value between the columns 220 may be determined based on at least one of a metadata similarity value, a semantic similarity value, and a unit similarity value. In some embodiments, the system 200 may determine the metadata similarity value using the metadata similarity module 230. Additionally or alternatively, the system 200 may determine the semantic similarity value using the semantic similarity module 240. Additionally or alternatively, the system 200 may determine the unit similarity value using the unit similarity module 250. To determine at least one of the metadata similarity value, the sematic similarity value, and the unit similarity value, the system 200 may compare the columns 220.

In some embodiments, the columns 220 may be compared by the metadata similarity module 230 to determine the metadata similarity value between the columns 220. The metadata similarity module 230 may be able to receive one or more of the columns 220, such as the first column 220*a*.

In some embodiments, the metadata similarity module 230 may additionally be configured to extract metadata from the values of the columns. For example, the metadata similarity module 230 may extract metadata from the first column 220*a*, the second column 220*b* and/or the nth column 220*n*. In some embodiments, the extracted metadata may include a data type for the values, statistics associated with the values (e.g., minimum, maximum, range, etc.), data distribution of the values (e.g., variance, standard deviation, etc.), and/or characteristic types associated with the values (e.g., length, quantity, volume, etc.).

In some embodiments, the metadata similarity module 230 may be configured to compare the extracted metadata from one column with extracted metadata from another column (e.g., the metadata extracted from the first column 220*a* and the metadata extracted from the second column 220*b*). In some embodiments, the metadata similarity module 230 may be configured to compare the extracted metadata from any number of columns (e.g., the metadata extracted from the first column 220*a*, the second column 220*b*, and/or the nth column 220*n*). The metadata similarity module 230 may compare the extracted metadata between columns, such as comparing the data type, the data distribution, the characteristic type, and/or any other information extracted from the values of the respective columns.

In these and other embodiments, the metadata similarity module 230 may determine a metadata similarity value by comparing the extracted metadata from the first values in the first column 220*a* and the extracted metadata from the second values in the second column 220*b* as described and illustrated in further detail in FIGS. 3A and 3B below.

In some embodiments, the semantic similarity module 240 may be configured to compare extracted semantic data from one column with extracted semantic data from another column (e.g., the title extracted from the first column 220*a* and the title extracted from the second column 220*b*). The semantic similarity module 240 may compare the extracted semantic data between columns, such as comparing the titles, values extracted from the respective columns, and any other information extracted from the respective columns. In some embodiments, semantic similarity module 240 may additionally be configured to generate a semantic similarity value between respective columns based on comparing the extracted semantic data between columns.

In some embodiments, the unit similarity module 250 may be configured to compare a unit of measurement for the values from one column with a unit of measurement from another column (e.g., the unit of measurement for the values in the first column 220*a* and the unit of measurement for the values in the second column 220*b*).

In some embodiments, the unit of measurement module 250 may be configured to predict a unit of measurement for the values in each of the columns 220. For example, the values in the first column 220*a* and/or the associated metadata or other associated information may not include a unit of measurement for the values. In these and other embodiments, the unit of measurement module 250 may be configured to predict a unit of measurement for the values in the first column 220*a* as described and illustrated in further detail in FIGS. 5-8 below.

In some embodiments, the unit of measurement module 250 may be configured to predict the unit of measurement for the values in any number of columns by using a language model. For example, the unit of measurement module 250 may generate a question designed to elicit an answer that includes a predicted unit of measurement. In some embodiments, the unit of measurement module 250 may additionally be configured to send the question to the language model. In these and other embodiments, the language model may be configured to receive the question and generate an answer that includes the predicted unit of measurement.

In some embodiments, the unit of measurement module 250 may receive the values and/or the title from the first column 220*a* when the values do not have a known unit of measurement. In some embodiments, the unit of measurement module 250 may generate a question that includes one of the values in the first column 220*a*. In these and other embodiments, the question generated by the unit of measurement module 250 may include additional or other information obtained regarding the title of the first column 220*a*. For example, the question generated may include "what is the unit of [the title]?" Continuing the example, the title may be "price per square foot" and the question may read, "what is the unit of price per square foot?" In these and other embodiments, the generated question may be sent to the language model such that the question may elicit an answer that includes a predicted unit of measurement. In some embodiments, the language model may return an answer that includes the predicted unit of measurement.

While illustrated using one column, it will be appreciated that the unit of measurement module 250 may generate questions for any number of columns to facilitate prediction of associated units of measurement. For example, the unit of measurement module 250 may generate questions for the first column 220*a*, the second column 220*b*, and/or the nth column 220*n*.

In some embodiments, the unit of measurement module 250 may be configured to compare a first predicted unit of measurement from the first column, a second predicted unit of measurement from the second column, up to an nth predicted unit of measurement from the nth column. In these and other embodiments, the unit of measurement module 250 may determine a first unit similarity value by comparing the first predicted unit of measurement to the second predicted unit of measurement. Additionally or alternatively, the unit of measurement module 250 may be configured to determine a second unit similarity value by comparing the second predicted unit to the nth predicted unit of measurement.

In some embodiments, the system 200 may be configured to generate clusters of columns. In some embodiments, the clusters may be generated by a cluster module 260. Additionally or alternatively, the cluster module 260 may be configured to add one or more columns to the clusters. In some embodiments, the cluster module 260 may be configured to receive the dataset 210 that may include the first column 220*a*, the second column 220*b*, up to the nth column 220*n*. In these and other embodiments, the cluster module 260 may be configured to receive the metadata similarity value from the metadata similarity module 230, the sematic similarity value from the semantic similarity module 240, and/or the unit similarity value from the unit of measurement module 250. In these and other embodiments the metadata similarity value, the semantic similarity value, and/or the unit similarity value may together constitute a total similarity value between the columns 220, for example, between the first column 220*a* and the second column 220*b*.

In some embodiments, the cluster module 260 may be configured to generate a cluster of similar columns. For example, the cluster module 260 may generate a first cluster that may include the first column 220*a* and the second column 220*b*. In these and other embodiments, the cluster module 260 may determine that columns are similar based on one or more of the metadata similarity value, the semantic similarity value, and/or the unit similarity value falling below a threshold. For example, the first column 220*a* and the second column 220*b* may be determined to be similar because at least one of the metadata similarity value, the semantic similarity value, and/or the unit similarity value may fall below a threshold. In some embodiments, the first column 220*a* and the second column 220*b* may be determined to be similar because the total similarity value falls beneath the threshold. The clustering and/or the associated threshold is further described and illustrated in FIGS. 3, 4, and 8 below.

By way of example, complete similarity between columns may be shown with a total similarity value of zero; by contrast, complete dissimilarity between columns may be shown with a total similarity value of infinity. As indicated above, a smaller total similarity value may indicate greater similarity between columns than a larger total similarity value. Therefore, a threshold may be set such that a total similarity value below the threshold may indicate similarity between columns such that the columns may be clustered.

Alternatively, the opposite may be true. For example, complete similarity between columns may be shown with a total similarity value of infinity; by contrast, complete dissimilarity between columns may be shown with a total similarity value of zero. Therefore, a threshold may be set such that a total similarity value above the threshold may indicate greater similarity between columns such that the columns may be clustered.

In some embodiments, instead of a value of infinity and zero for complete similarity or dissimilarity, the similarity values may include a value between zero and one, with one representing complete similarity and zero representing complete dissimilarity, or with one representing complete dissimilarity and zero representing complete similarity.

In some embodiments, the cluster module 260 may add one of the columns 220 to an existing cluster. For example, the nth column including the nth number of values and the nth title may be similar to the first column 220*a* and the second column 220*b* in the first cluster. Based on the similarity, the cluster module 260 may add the nth column to the first cluster such that the first cluster includes each of the first column 220*a*, the second column 220*b*, and the nth column 220*n*. In some embodiments, the nth column may be found dissimilar from the first column 220*a* and the second column 220*b* in the first cluster. In such embodiments, the cluster module 260 may generate a second cluster that includes the nth column 220*n*.

In some embodiments, the system 200 may generate a new column 220*d* based on the columns 220 in the clusters generated by the cluster module 260. The system 200 may automatically select and deploy a feature engineering function that may perform a mathematical operation on a value in at least one of the columns 220 in at least one of the clusters. In these and other embodiments, the system 200 may generate a new dataset 270 that may include the new column 220*d*. For example, the new dataset 270 may include the first column 220*a*, the second column 220*b* up to the nth column 220*n*, and a new column 220*d*.

In some embodiments, the new values in the new column 220*d* may be generated by the feature engineering function that may be automatically selected and deployed by the system 200. For example, the first column 220*a* with the first values may be similar to the second column 220*b* with the second values and the first column 220*a* and the second column 220*b* may be added to the first cluster based on the similarity. For example, the first values may indicate a "price per square foot" for residential homes and the second values may indicate "total square feet" for residential homes. Further continuing the example, the feature engineering function may multiply the first values in the first column 220*a* and the second values from the second column 220*b* which may generate a third column with third values that may indicate a "total home price." In some embodiments, the third column with the third values may be added to the first cluster with the first column and the second column and may be the new column 220*d* added to the dataset 210 to form the new dataset 270.

In some embodiments, the system 200 may be configured to send the new dataset 270 that may include the first column 220*a*, the second column 220*b* up to the nth column 220*n*, and the new column 220*d* to the machine learning system 280. In some embodiments, the machine learning system 280 may be included in the system 200. In these and other embodiments, the machine learning system 280 may be configured to receive the new dataset 270. In some embodiments, the machine learning system 280 may be trained by the new dataset 270.

Modifications, additions, or omissions may be made to the system 200 without departing from the scope of the disclosure. For example, the designations of different elements in the manner described is meant to help explain concepts described herein and is not limiting. Further, the system 200 may include any number of other elements or may be implemented with other systems or environments than those described.

Figure 3A:
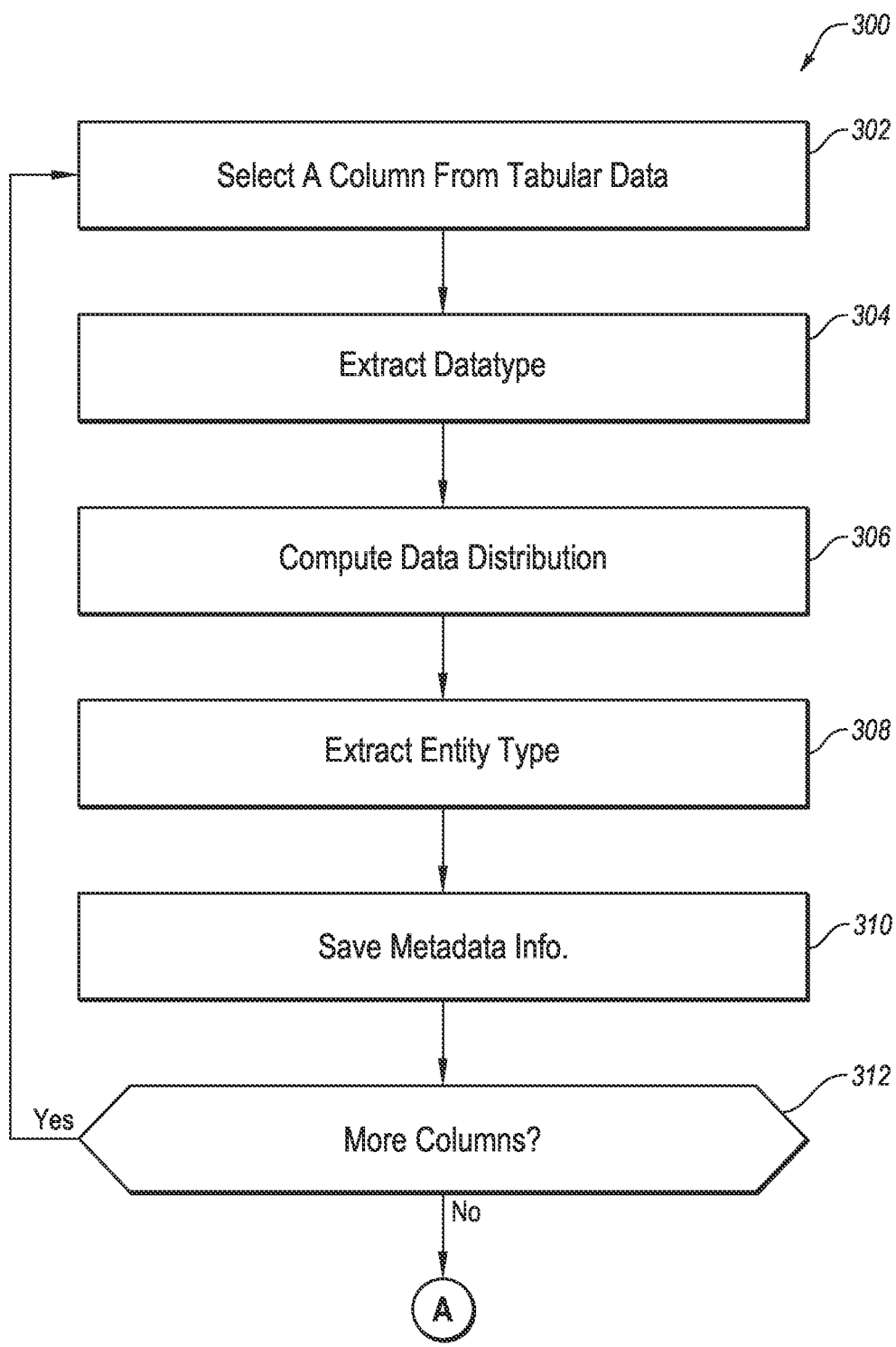
FIG. 3A illustrates a flowchart of an example method of extracting information for computing a metadata similarity value.

FIG. 3A illustrates a flowchart of an example method 300 of extracting information for computing a metadata similarity value, in accordance with at least one embodiment described in the present disclosure. The method 300 may be performed by any suitable system, apparatus, or device with respect to the feature engineering system 100 of FIG. 1, the metadata similarity module 230 in FIG. 2, and/or the system 200 in FIG. 2. The method 300 may include one or more blocks 302, 304, 306, 308, 310, and 312. Although illustrated with discrete blocks, the steps and operations associated with one or more of the blocks of the method 300 may be divided into additional blocks, combined into fewer blocks, or eliminated, depending on the particular implementation.

In some embodiments, the method 300 may begin at block 302. At block 302, a column may be selected from tabular data. In some embodiments, the tabular data may be in the form of a dataset that may include values that may be organized into column(s) where each of the columns may include a title. In some embodiments, the feature engineering system 120 as described above in FIG. 1 above may be configured to select the column(s). In these and other embodiments, the columns may be the same or similar to the columns 220 in FIG. 2 illustrated above. Additionally or alternatively, the column may be selected from the dataset that may be the same or similar to the dataset 210 in FIG. 2 and/or the dataset 110 in FIG. 1 as described and illustrated above.

At block 304, a data type may be extracted. In some embodiments, the data type may be extracted by a system, device, or apparatus configured to extract the data type from the tabular data (e.g., the system 100 in FIG. 1, the feature engineering system 120 in FIG. 1, the system 200 via the metadata similarity module 230 as described above in FIG. 2). In some embodiments, the data type may be extracted from the values in the columns selected from the tabular data. For example, the data type may be a part of the metadata or may be extracted by analyzing characteristics of the values in the column to extract the data type. In these and other embodiments, the data type may be one of an integer, double, float, floating point, string, character, boolean, or other data types that may describe the values in columns selected from the tabular data.

At block 306, a data distribution may be computed. In some embodiments, the values in each of the columns selected from the tabular data may include descriptive metadata from which values describing the data distribution may be computed. For example, each column may include a minimum value and a maximum value from which a range for each column may be computed by determining the difference between the maximum value and the minimum value. In these and other embodiments, data distribution values may be computed from the values in the columns (e.g., a variance, a standard deviation, a mode, a median, a local maximum, a local minimum, a distribution of data, a shape of data, a correlation, a probability, a covariance, a skewness, and/or other values that may describe the data distribution of the columns).

At block 308, a characteristic type may be determined from the values from the columns in the tabular data. In some embodiments, the characteristic type may include a length, an area, a location, a time, a volume, a quantity, a quality, a density, a level, a count, an amount, or another descriptor of the characteristic type of values in each of the columns. In these and other embodiments, any suitable device or system may be configured to deduce or otherwise determine the characteristic type or characteristic types. For example, the system 200 described and illustrated in FIG. 2 or another device or system configured to perform operations as described in the metadata similarity module 230 illustrated in FIG. 2.

At block 310, the data distribution values, data types, characteristic types, and other forms of metadata may be saved for each of the columns. In these and other embodiments, the data types, the characteristic types, and the other forms of metadata ("the metadata") extracted and calculated as described in the method 300 may be stored and may be associated with each of the columns from which the metadata may be extracted.

At block 312, a determination may be made if more columns exist in the tabular data. In some embodiments the metadata from each of the columns may be extracted from the tabular data. In these and other embodiments, a system may be configured to determine whether the metadata has been extracted from each of the columns and, if not, the system may select another column and may begin a process of extracting the metadata beginning at block 302.

In some embodiments, a determination may be made that there are no further columns in the dataset from which to extract metadata. In some embodiments, after the metadata has been extracted from the columns, the method 300 may continue to FIG. 3B as described and illustrated below.

Modifications, additions, or omissions may be made to the method 300 without departing from the scope of the present disclosure. For example, the operations of method 300 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described embodiments.

Figure 3B:
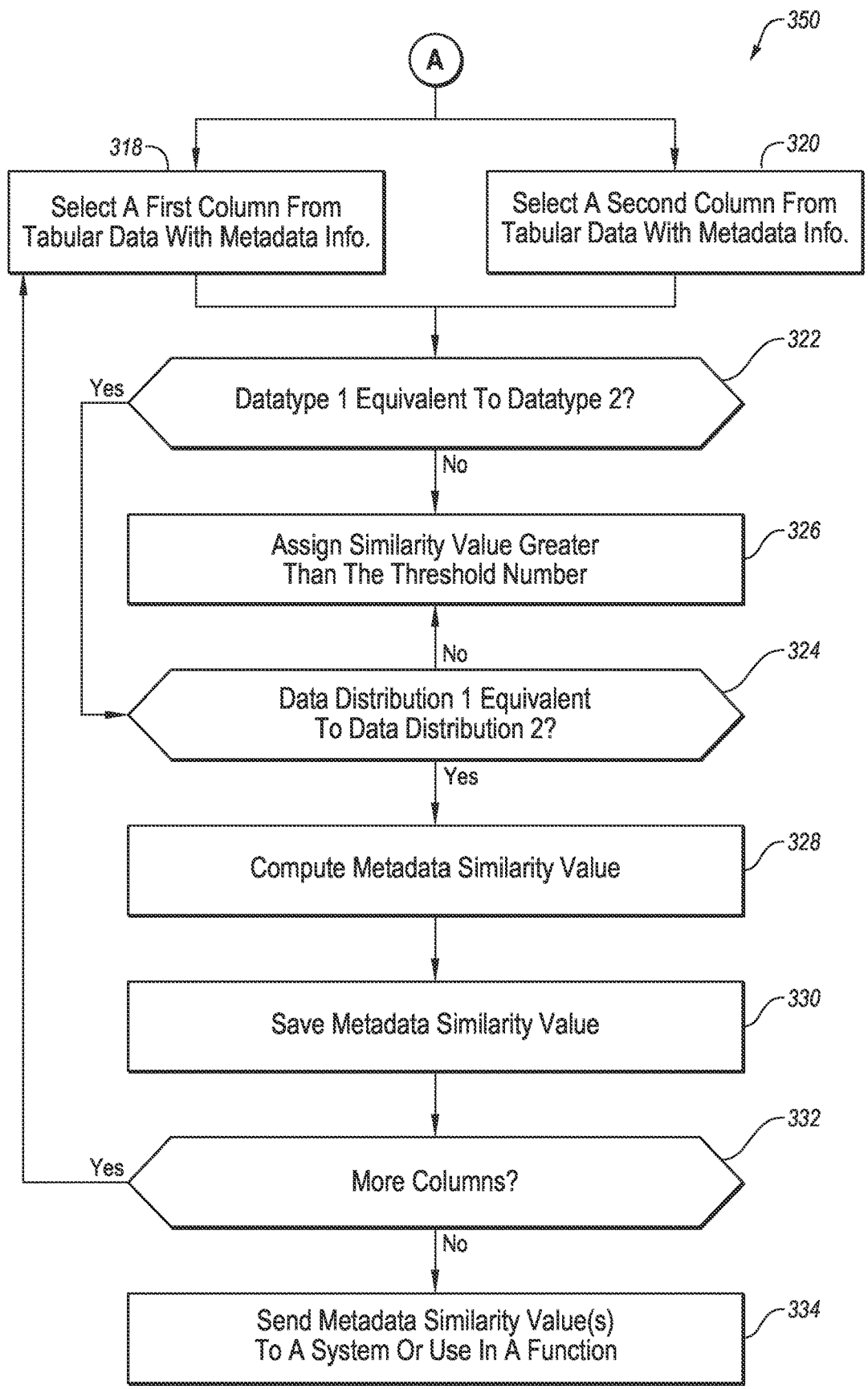
FIG. 3B illustrates a flowchart of an example method of determining a metadata similarity value.

FIG. 3B illustrates a flowchart of an example method 350 of determining a metadata similarity value, in accordance with at least one embodiment described in the present disclosure. The method 350 may be performed by any suitable system, apparatus, or device with respect the feature engineering system 100 of FIG. 1, the metadata similarity module 230 in FIG. 2, and the system 200 in FIG. 2. The method 300 may include one or more blocks 318, 320, 322, 324, 326, 328, 330, 332, and 334. Although illustrated with discrete blocks, the steps and operations associated with one or more of the blocks of the method 350 may be divided into additional blocks, combined into fewer blocks, or eliminated, depending on the particular implementation.

In some embodiments, the method 350 may be a continuation of the method 300 as described and illustrated above in FIG. 3A. In some embodiments the method 350 may begin at block 318. At block 318, a first column may be selected that includes extracted metadata. In some embodiments, the extracted metadata may include at least one of the data type, the characteristic type, or other forms of metadata as described above in the method 300 and illustrated in FIG. 3A.

At block 320, a second column may be selected that includes extracted metadata. In some embodiments, the extracted metadata may include at least one of the data type, the characteristic type, or other forms of metadata as described in the method 300 above and illustrated in FIG. 3A. In some embodiments, the extracted metadata from the first selected column may include similar information to the extracted metadata from the second selected column. For example, the extracted metadata from the first selected column may include a data type, a minimum, a maximum, a mean, and a characteristic type. Additionally, the extracted metadata from the second selected column may include a data type, a minimum, a maximum, a mean, and a characteristic type. In some embodiments, the extracted metadata from the first selected column may not be similar to the extracted metadata from the second selected column.

At block 322, a determination may be made as to whether the data type from the first selected column is equivalent to the data type from the second selected column. For example, the data type from the first selected column may be an integer and the data type from the second selected column may also be an integer. Continuing the example, it may be determined that both data types are therefore equivalent. In some embodiments, the data types may not be the same while remaining equivalent according to aspects of these embodiments. For example, one data type may be an integer while another data type be a float value. Further continuing the example, the data types may be equivalent even if the data types do not match because they may be comparable enough for the system to compare the values in the first column to the values in the second column. In some embodiments, the data types may not be equivalent. For example, one data type may be an integer and another data type may be a string. Continuing the example, the data types may not be equivalent because the integer may not be adequately comparable to the string such that a metadata similarity value may be determined. If the data types are equivalent, the method 350 may proceed to the block 324. If the data types are not equivalent, the method 350 may proceed to the block 326.

At block 324, it is determined whether a first data distribution may be equivalent to a second data distribution. In some embodiments, the first data distribution may be equivalent to the second data distribution if the values in the first column may be comparable to the values in the second column. For example, the first data distribution may include a range of values between 75-100 and the second data distribution may include a range of values from 60-115. Continuing the example, the first range of values and the second range of values may be equivalent because the values from the first column and the values from the second column may be comparable. In some embodiments, the first data distribution and the second data distribution may be equivalent based on any number of rules established to determine equivalence. For example, one of the rules established to determine equivalence may include that the range of values in the first data distribution is on a similar scale to the range of values in the second data distribution. As another example, the range of values in the first data distribution may be equivalent to the range of values in the second data distribution if the larger of the range of values is less than twice that of the smaller of the range of values. For example, if the range of values in the first data distribution between a minimum and a maximum is 50 and the range of values in the second data distribution between a minimum and a maximum is 150 (more than twice that of the range of values in the first data distribution) the ranges of values may not be equivalent. If the data distributions are equivalent, the method 350 may proceed to the block 328. If the data distributions are not equivalent, the method 350 may proceed to the block 326.

At block 326, a similarity value greater than a threshold number may be assigned. In some embodiments, the similarity value assigned between columns may be greater than the threshold value if the data type of the values in the first column is not equivalent to the data type of the values in the second column. For example, one data type may be a floating point and another data type may be a string. Continuing the example, the floating point and the string may not be comparable and, therefore, the similarity value may be assigned a greater value than the threshold value which may indicate that the values may not be similar. In these and other embodiments, a similarity value may range between zero and infinity, where a value of infinity may indicate no similarity whatsoever. In some embodiments, the similarity value may range between zero and one, where one may indicate no similarity whatsoever. Further continuing the example, the system, via the feature engineering function, may not generate new values for a new column when the similarity value above a threshold is assigned. In some embodiments, a distance may be computed between the values in the first column and the values in the second column. In some embodiments, the distance between the columns may be used to determine the metadata similarity value between the columns. In some embodiments, the values in the first selected column may be strings and the values in the second selected column may be strings. Additionally or alternatively, the distance may be determined by converting the strings in the first column into a vector and the strings in the second column into a vector. In some embodiments, the distance between the vectors may be determined using a Levenshtein distance, a cosine distance, or another mathematical similarity function configured to calculate the distance between the vectors representative of the values in the columns. In some embodiments, the distance calculated may be used to determine the metadata similarity value between the values in the first column and the values in the second column.

At block 328, a metadata similarity value may be determined between extracted metadata associated with the first column and the second column. In some embodiments, the metadata similarity value may be determined based on at least one of the distance between vectors, a distribution similarity between data distributions associated with the first column and the second column respectively, and a data type similarity between the first and second columns. In some embodiments, the metadata similarity value may be determined based on a previously determined threshold value. For example, it may have been previously determined that the threshold value be "2" and therefore a metadata similarity value assigned over "2" may indicate that the extracted metadata between the first and second selected columns may not be similar or, at least, the extracted metadata between the first and second columns may not be similar enough to include in a cluster as illustrated below in FIG. 9.

At block 330, the metadata similarity value may be saved. In some embodiments, the metadata similarity value may be saved such that the metadata similarity value may be associated with the first and second columns. In some embodiments, the metadata similarity value may be saved such that the metadata similarity value may be saved with other metadata similarity values each associated with a pair of columns. For example, there may be a metadata similarity value illustrating a similarity between the first column 220a and the second column 220b which may be saved with another metadata similarity value illustrating the similarity between the second column 220b and the nth column 220n.

At block 332, a determination may be made if more columns remain to be compared. In some embodiments, the tabular data may include columns that may each be compared to determine the metadata similarity value between each pair of the columns. For example, the tabular data may have three columns, the first column 220a, the second column 220b, and the nth column 220n. The method 300 may compare the first column 220a and the second column 220b, the first column 220a and the nth column 220n, and the second column 220b and the nth column 220n. In some embodiments, at block 332, the determination may be made whether each of those comparisons have yet been made. If the comparisons have been made, the method 350 may proceed to the block 334 and, if not, the method 350 may return to the block 318 and/or may return to the block 302 of the method 300.

Figure 9:
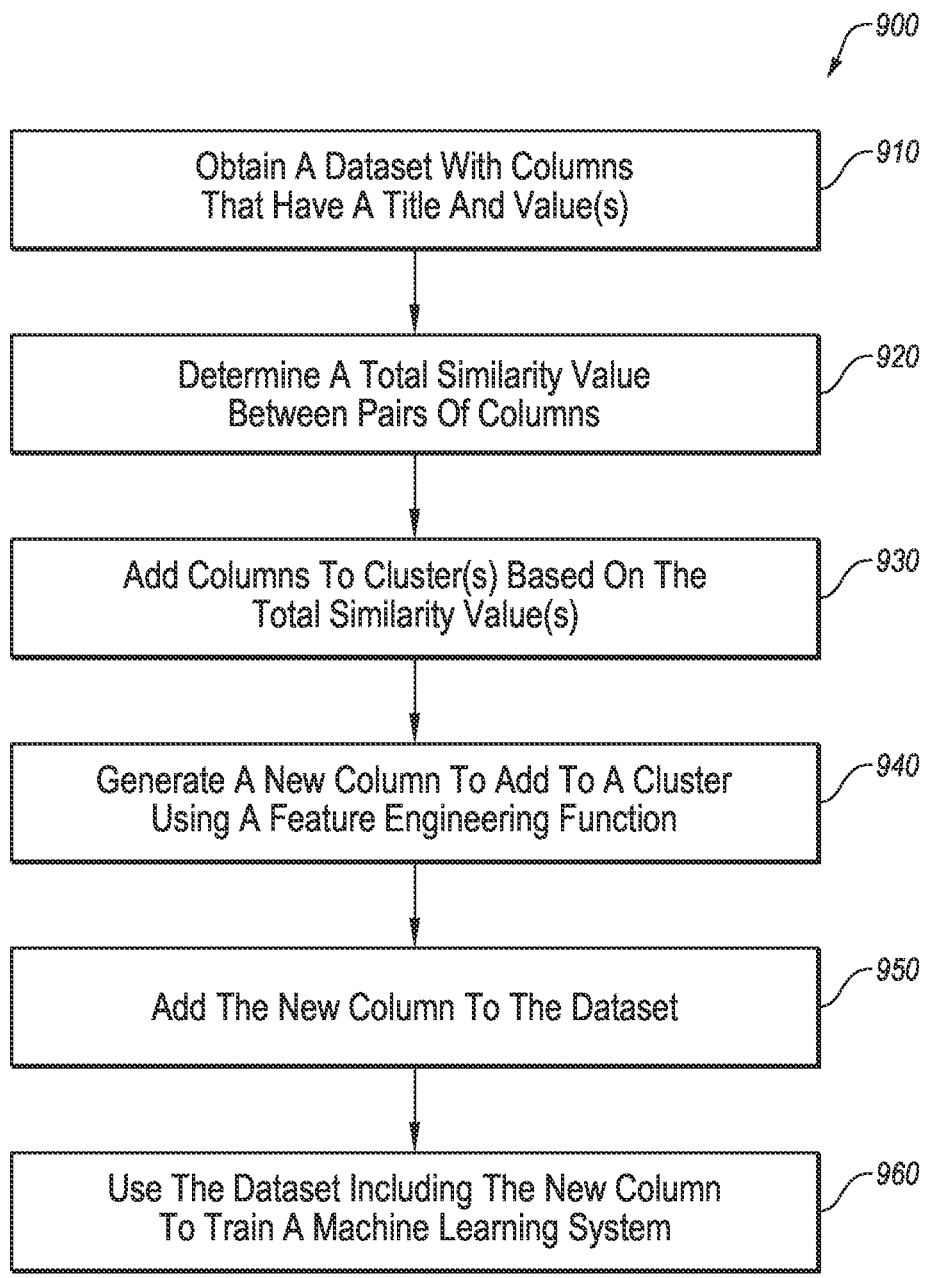
FIG. 9 illustrates a flowchart of an example method of generating a new column with new values to add to a dataset.

At block 334, metadata similarity values may be sent to a system or may be used in a function to create a total similarity value as illustrated in FIGS. 1, 2, and 9.

Modifications, additions, or omissions may be made to the method 350 without departing from the scope of the present disclosure. For example, the operations of method 350 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described embodiments.

Figure 4:
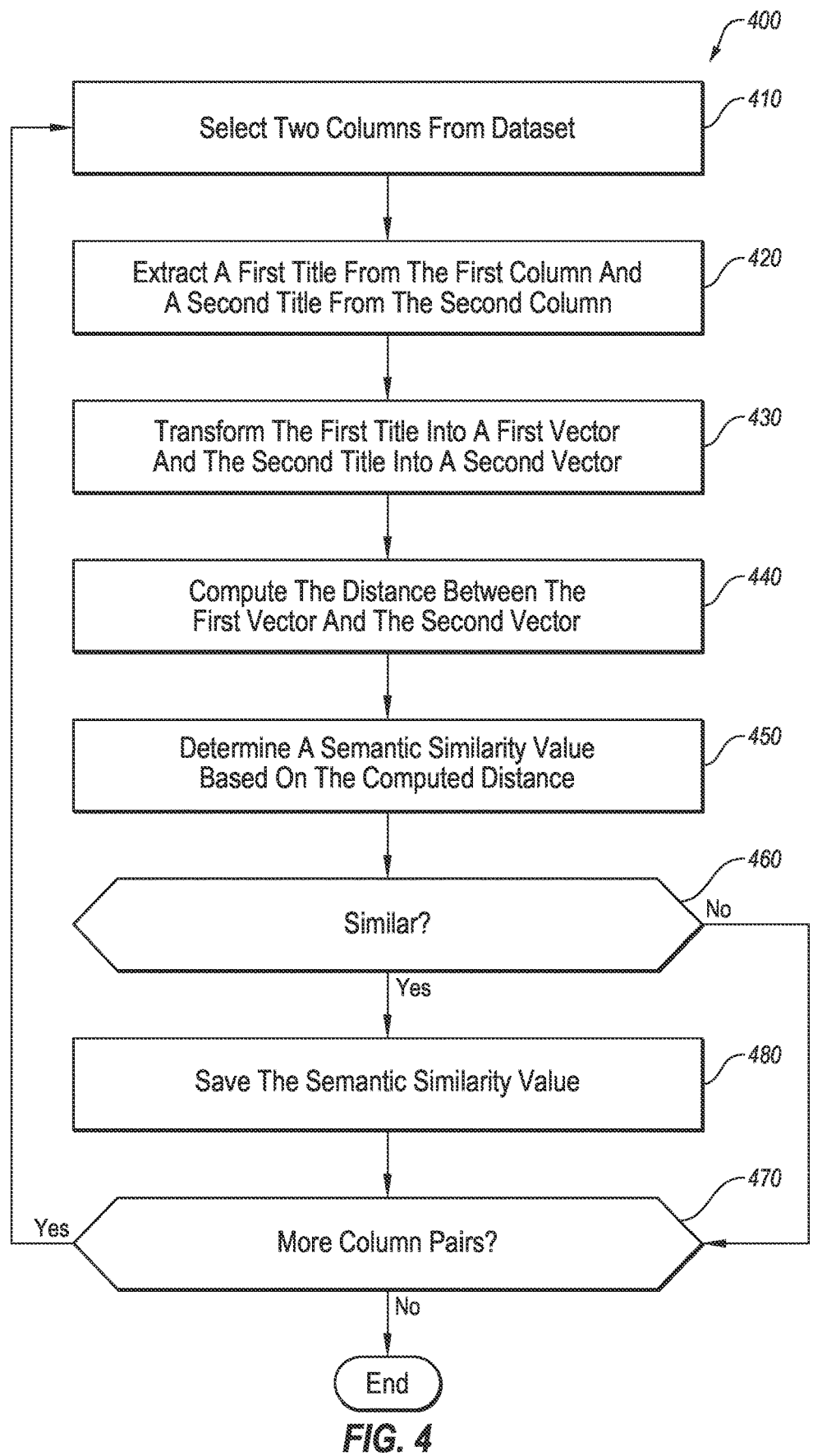
FIG. 4 illustrates a flowchart of an example method of determining a semantic similarity value.

FIG. 4 illustrates a flowchart of an example method 400 of determining a semantic similarity value between a pair of columns in a dataset, in accordance with at least one embodiment described in the present disclosure. The method 400 may be performed by any suitable system, apparatus, or device with respect to the feature engineering system 100 of FIG. 1, the semantic similarity module 240 in FIG. 2, and the system 200 in FIG. 2. The method 400 may include one or more blocks 410, 420, 430, 440, 450, 460, 470, and 480. Although illustrated with discrete blocks, the steps and operations associated with one or more of the blocks of the method 400 may be divided into additional blocks, combined into fewer blocks, or eliminated, depending on the particular implementation.

In some embodiments, the method 400 may start at block 410. At block 410, a pair of columns may be selected from a dataset. In some embodiments, the pair of columns selected from the dataset may include a pair of columns which may each include a title. In some embodiments, the titles may describe values in each of the columns of the dataset. For example, one value in one of the columns may be 150 and the corresponding title may be "Price per Square Foot" which may describe the value(s).

At block 420, a first title in a first column and a second title in a second column may be extracted from the dataset. In some embodiments, the first title in the first column and the second title in the second column may not be the same. Additionally or alternatively, the first title and the second title may be the same. In some embodiments, the first title in the first column may be abbreviated. For example, the first title may be "GarageYrBlt" which may be an abbreviated form of "Garage Year Built."

At block 430, the first title may be converted into a first vector and the second title may be converted into a second vector. In some embodiments, the first title and the second title may be converted into the first vector and the second vector, respectively, using an embedding function. Examples of the embedding function may include Word2Vector, Bidirectional Encoder Representations from Transformers-Embedding ("BERT-Embedding"), Generative Pre-trained Transformer ("GPT-Embedding"), and any other function capable of converting titles into vectors. In some embodiments, the first vector may include a numerical representation of the words in the first title and the second vector may include a numerical representation of the words in the second title.

At block 440, a distance between the first vector and the second vector may be computed. In some embodiments, the distance between the first vector and the second vector may be computed using a similarity function. In some embodiments, the similarity function may be a cosine similarity function, a Euclidean distance function, or any other function designed to determine the distance between two vectors. In some embodiments, the distance computed between the first vector and the second vector may be used to determine whether the first title in the first column and the second title in the second column may be similar. In some embodiments, a smaller distance between the first vector and the second vector may be an indicator that the first title and the second title may be similar. For example, the first title may be "1 stFlrSF" which may be an abbreviated form of "First Floor Square Feet" and the second title may be "2ndFlrSF" which may be an abbreviated form of "Second Floor Square Feet." Continuing the example, the first title and the second title may be converted into the first vector and the second vector and the distance computed between the first vector and the second vector may be 0.25. In another example the first title may be "1 stFlrSF" and the second title may be "HousingPrice." In the second example, the first title may be converted into the first vector and the second title may be converted into the second vector and the distance computed between the first vector and the second vector may be 1.25. In the above examples, the distance computed in the first example may be smaller than the distance computed in the second example which may indicate that there may be a greater similarity in the first example between the first title and the second title than may be between the first title and the second title in the second example.

At block 450, a sematic similarity value may be determined based on the computed distance between the first vector and the second vector. In some embodiments, the semantic similarity value may be the same as the computed distance between the first vector and the second vector. In some embodiments, the computed distance between the first vector and the second vector may be converted into the semantic similarity value based on a number of factors including the distance between the first vector and the second vector. In some embodiments, the semantic similarity value may be determined based on the distance between the first vector and the second vector in addition to a comparison between predicted units of measurement associated with the first column and the second column. For example, the dataset may include a first column and a second column where the first column may have a title, "salary" which may describe values in the first column and the second column may have a title, "overall" which may describe values in the second column. Continuing the example, it may be determined that the values in the first and second columns both have a predicted unit of "dollars" that may be predicted using a method according to various embodiments described below with respect to FIGS. 5-8. Further continuing the example, it may be determined that the distance between the first title "salary" and the second title "overall" may be relatively high which may indicate that the first column and the second column may not be similar. However, because the values have the same predicted unit, "dollars," the semantic similarity value between the first column and the second column may be lower than the semantic similarity value may have been using the distance between the first title and the second title alone, which may indicate that the first column and the second column may be similar.

At block 460, a determination may be made whether the first column and the second column are to be considered similar. In some embodiments, the determination may be based on whether or not a semantic similarity value is below a threshold. For example, the distance between the first vector and the second vector may be determined. If the distance is above a threshold value, the first column and the second column may not be similar. If it is determined that the first and second columns are not to be considered similar, the method 400 may proceed to the block 470. If it is determined that the first and second column are to be considered similar, the method 400 may proceed to the block 480.

At block 470, a determination may be made if more columns exist to compare. In these and other embodiments, each of the columns may be compared to each other. For example, the dataset may include a first column, a second column, and a third column. Continuing the example, the first column may be compared to the second column and the third column, and the second column may be compared to the third column. In some embodiments, a determination may be made after each comparison whether all columns have been compared. If there are additional pairs for analysis, the method 400 may return to the block 410 to consider another pair of columns. If there are no additional pairs of columns for analysis, the method may end.

At block 480, the semantic similarity value determined at block 450 may be saved. In some embodiments, the semantic similarity value may be saved such that the semantic similarity value may be associated with the pair of columns. The semantic similarity value may be saved which may be used by a feature engineering function along with a data similarity value and a metadata similarity value to determine whether the pair of columns may be clustered together as described and illustrated in FIG. 9, below. After the block 480, the method 400 may proceed to the block 470 to determine if there are any additional pairs of columns for analysis of any remaining pairs of columns.

Modifications, additions, or omissions may be made to the method 400 without departing from the scope of the present disclosure. For example, the operations of method 400 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described embodiments.

Figure 5:
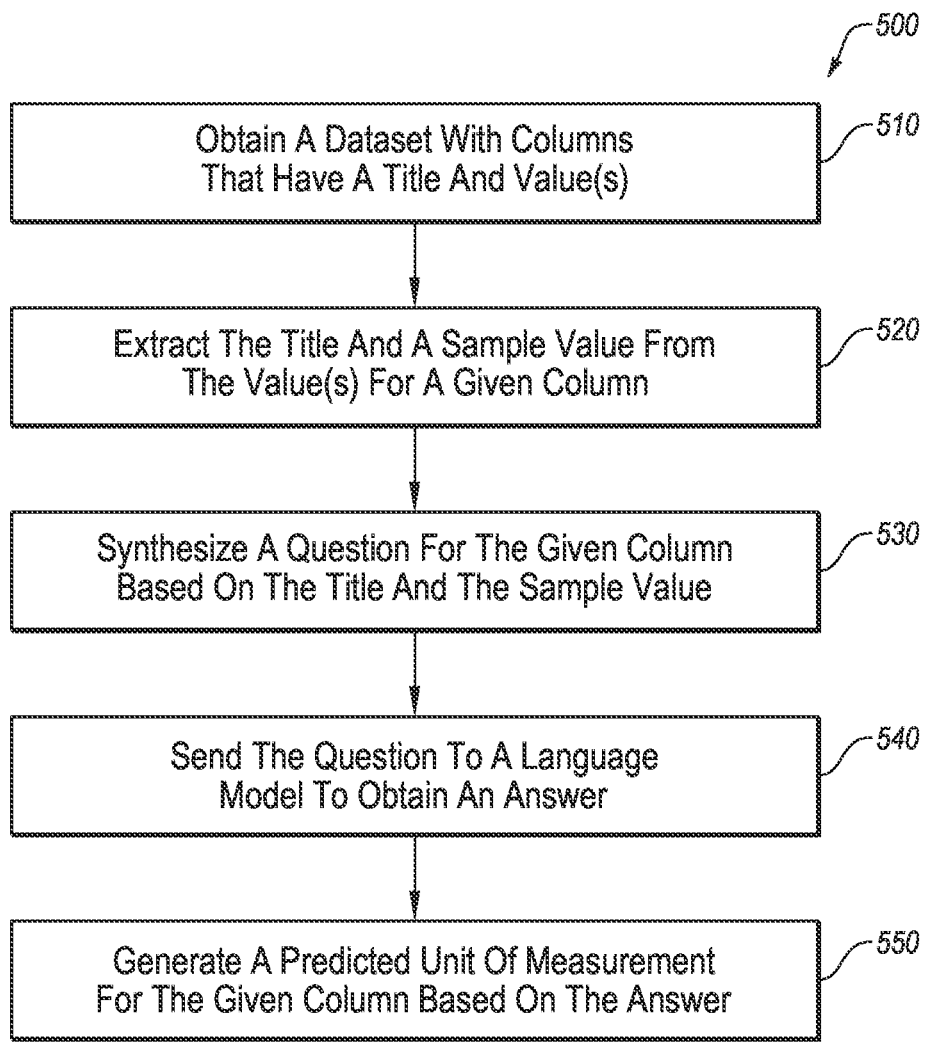
FIG. 5 illustrates a flowchart of an example method of generating a predicted unit of measurement for a value in a dataset.

FIG. 5 illustrates a flowchart of an example method 500 of generating a predicted unit of measurement for a value in the dataset, in accordance with at least one embodiment described in the present disclosure. The method 500 may be performed by any suitable system, apparatus, or device with respect to the feature engineering system 100 of FIG. 1, the unit similarity module 250 in FIG. 2, and the system 200 in FIG. 2. The method 500 may include one or more blocks 510, 520, 530, 540, and 550. Although illustrated with discrete blocks, the steps and operations associated with one or more of the blocks of the method 500 may be divided into additional blocks, combined into fewer blocks, or eliminated, depending on the particular implementation.

In some embodiments, the method 500 may start at block 510. At block 510, a dataset may be obtained that may include column(s) with a title/or and value(s). Examples of such a dataset are illustrated as the dataset 210 illustrated in FIG. 2 and/or the dataset 110 illustrated in FIG. 1.

At block 520, the title and the value(s) may be extracted from the columns. In some embodiments, the title and the values may be extracted from the columns in combination such that the system may be configured to synthesize a question that may include both the title and the values as discussed at block 530 below.

At block 530, a question may be synthesized based on the title and the value(s). In some embodiments, the question may be synthesized as a natural language question. In these and other embodiments, the question may be synthesized such that the question may elicit a response that may include a predicted unit of measurement for the values. For example, the question synthesized may include "what is the unit of [the value(s)]?" which may be drafted to elicit a response that includes the unit of measurement for the values in the column. In these and other embodiments, the question synthesized may be drafted with the value(s) and the title such that the question may provide some additional context to the question. For example, the title of a column may be "Basement Square Feet" and the value in the column may be 1,000. Further continuing the example, the question synthesized may include "The Basement Square Feet is 1,000, what is the unit of Basement Square Feet?" In these and other embodiments, the title of the column may be abbreviated, for example, instead of the title being "Basement Square Feet," the first title may be "BmtSF." Therefore, as illustrated in the above example, the question synthesized may be "The BmtSF is 1,000, what is the unit of BmtSF?" In these and other embodiments, the question synthesized may be based on other considerations which may include a column description, an expanded title, a number of sample questions, a machine learning task description, a number of question-answer examples, and other relevant considerations as illustrated and described further in FIG. 7, below.

At block 540, the question synthesized may be sent to a language model to obtain an answer. In some embodiments, the question may be sent to the language model such that the language model may generate an answer to the question that may include a predicted unit of measurement. In these and other embodiments, the language model may include a pre-trained large language model which may include language models such as Generative Pre-Trained Transformer 3 ("GPT3"), Bidirectional Encoder Representations from Transformers ("BERT"), Robustly Optimized Bidirectional Encoder Representations from Transformers ("RoBERTa"), Text-to-Text Transfer Transformer ("T5"), and other language models designed to receive the question synthesized and provide an answer that may include a predicted unit of measurement. In these and other embodiments, a larger language model may more accurately answer the question synthesized. For example, a T5-11b language model includes 11 billion parameters that the language model may attempt to improve during training whereas a T5-Small language model includes 60 million parameters that the language model may attempt to improve during training. Continuing the example, the T5-11b language model may be trained using a larger dataset than, for example, a T5-Small language model and therefore the T5-11b language model may be better suited to answer the question accurately than the T5-Small language model.

At block 550, a predicted unit of measurement may be generated based on the answer. In some embodiments, one question may be synthesized and sent to the language model and the language model may provide the predicted unit of measurement as the answer to the synthesized question. In some embodiments, questions may be generated based on values and a title in the column. In some embodiments, the language model may be configured to receive multiple questions for multiple values in a given column, or even each of the values in the given column. In these and other embodiments, the language model may be configured to provide an answer to each of the questions. In some embodiments, the predicted unit of measurement may be selected based on agreement from a majority of the answers provided by the language model for multiple questions. For example, the first column may include a first title, a first value, a second value, and a third value. Continuing the example, a first question may be synthesized based on the first title and the first value, a second question may be synthesized based on the first title and the second value, and a third question may be synthesized based on the first title and the third value. Each of the first question, second question, and third question may be sent to the language model, and the language model may provide a first answer to the first question, a second answer to the second question, and a third answer to the third question. Continuing the example, the first answer and the second answer may be the same and the third answer may be different. In such a circumstance, the majority answer (e.g., the first answer and the second answer) may be the predicted unit of measurement as further described and illustrated in FIG. 8, below.

Modifications, additions, or omissions may be made to the method 500 without departing from the scope of the present disclosure. For example, the operations of method 500 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described embodiments.

Figure 6:
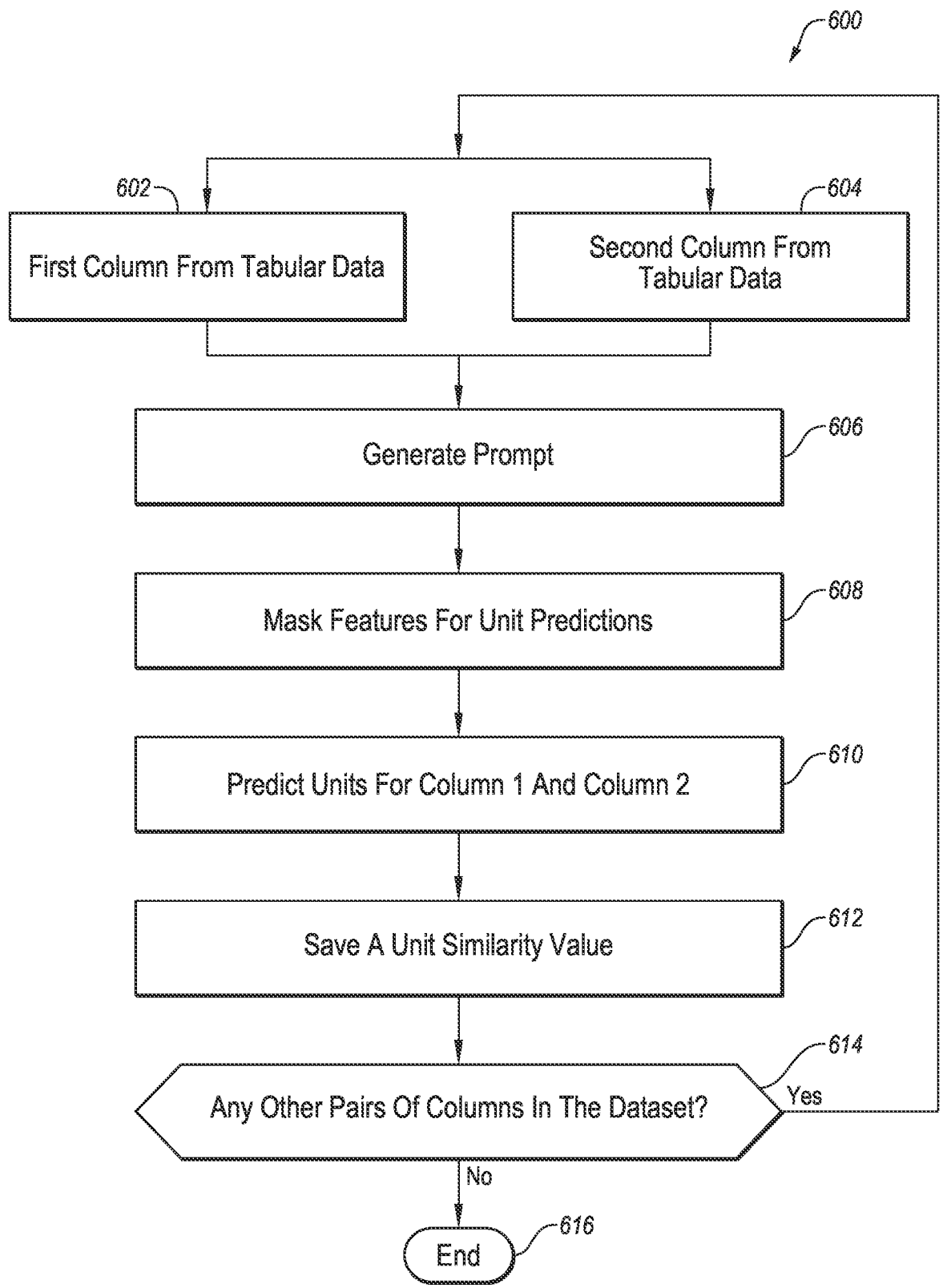
FIG. 6 illustrates a flowchart of an example method of determining a unit similarity value between two predicted units.

FIG. 6 illustrates a flowchart of an example method 600 of determining a unit similarity value between two predicted units, in accordance with at least one embodiment described in the present disclosure. The method 600 may be performed by any suitable system, apparatus, or device with respect to the feature engineering system 100 of FIG. 1, the unit similarity module 250 in FIG. 2, and the system 200 in FIG. 2. The method 600 may include one or more blocks 602, 604, 606, 608, 610, 612, 614, and 616. Although illustrated with discrete blocks, the steps and operations associated with one or more of the blocks of the method 600 may be divided into additional blocks, combined into fewer blocks, or eliminated, depending on the particular implementation.

In some embodiments, the method 600 may start at blocks 602 and 604. At block 602, a first column may be selected from a dataset and at block 604 a second column may be selected from the dataset. In these and other embodiments, the first column and the second column may each include a title and a value where the values in the first column may have a unit of measurement and the values in the second column may have a unit of measurement.

At block 606, a prompt may be generated. In some embodiments, the prompt generated may be the question synthesized as described and illustrated in method 500 at block 530 above. Additionally or alternatively, the prompt may be generated in accordance with considerations that may be used to synthesize a question as detailed and illustrated in method 700 in FIG. 7 below. For example, some of the considerations detailed in FIG. 7 below may include a number of sample column values, a column description, an expanded column name, a machine learning task description, example question-answer pairs, and other forms of information that may be useful in generating the prompt sent to the language model and that may be designed to elicit an answer that may include a unit of measurement. In some embodiments, the prompt may be generated to receive an answer from a language model where the language model may be predicting a unit of measurement for the values in the first column and a unit of measurement for the values in the second column. For example, the values in the first column may include a value, 1,050, where the value does not include a unit of measurement. Continuing the example, the prompt may be generated and may include a question that may be designed to elicit a response and the response may include a predicted unit of measurement for the value. The prompt may include the following: "What is the unit of measurement for 1,050?" Additionally or alternatively, the prompt may include additional information, for example, the title of the first column, the column description, the expanded column name, the machine learning task description, example question-answer pairs, and other forms of information. In the above example, the title of the first column may be "TotSF" and the machine learning task description may be "predict housing prices" and, with that additional information the prompt may be: "To predict housing prices, TotSF is 1,050. What is the unit of TotSF?" Continuing the example, the prompt may be designed to elicit a predicted unit of "square feet."

At block 608, features for unit prediction may be masked. In some embodiments, the prompt may include a masked unit such that the prompt may be designed to have the masked unit replaced by the predicted unit of measurement. In these and other embodiments, the values in the first column may be used in a prompt that may include a masked unit. In some embodiments, the values in the second column may be used in a second prompt that may include another masked unit. For example, the first column may have a value (1232), a title ("Bsmt total SF"), and a masked unit such that the prompt may be drafted as shown below:

The [MASK] is <value><column name>.
The [MASK] is 1232 Bsmt total SF.

In the above example, a purpose in drafting the prompt may be to elicit an answer for the masked unit which, in the above example, may be "square feet." Continuing the above example, the title of the first column may be expanded to read "Basement Square Footage" which may provide additional context with which the mask may be predicted with increased accuracy and speed.

At block 610, a predicted unit for the first column and a predicted unit for the second column may be provided. In some embodiments, the prompt as detailed above at block 608 may be sent to a language model. Additionally or alternatively, the language model may be pre-trained such that the language model may be capable of generating the predicted unit of measurement for the first column. In these and other embodiments, the language model may include language models such as GPT3, BERT, RoBERTa, and other language models designed to receive the prompt and provide the predicted unit of measurement as detailed and illustrated further in method 500 in FIG. 5 above. In some embodiments, the language model may provide several predicted units of measurement for the predicted unit of measurement for the first column. For example, the prompt may be "The [MASK] is 1232 Bsmt total SF" and the language model may provide four possible units where the language model may assign an associated probability that each of the four possible units may be correct. In response to the prompt above, the language model may answer with the following units of measurement:

area (square feet): 0.326
price (dollars): 0.252
population: 0.046
density: 0.023

In the above example, "area (square feet)" may be selected as the predicted unit of measurement because its probability may be the largest among the four possible units that may have been provided by the language model. In these and other embodiments, the argument maxima (argmax) of the predicted unit of measurement may be taken such that the predicted unit of measurement may be one of the four possible units that may have the highest probability of being correct.

At block 612, a unit similarity value may be saved. In some embodiments, the unit similarity value may be determined based on how similar the first predicted unit of measurement may be to the second predicted unit of measurement. In some embodiments, the unit similarity value may either be one or zero which may depend on if the predicted units of measurement match. For example, the predicted unit of measurement may be "square feet" which may match another predicted unit of measurement that may also be "square feet." Because the predicted units of measurement match, the unit measurement similarity value may be "0" between the predicted units of measurement. In another example, the first predicted unit of measurement may be "square feet" and the second predicted unit of measurement may be "square meters." Continuing the example, because the predicted units of measurement do not match, the unit measurement similarity value may be "1." In some embodiments, the unit measurement similarity value may be a value between zero and one which may depend on how similar the predicted units of measurement may be. For example, one predicted unit of measurement may be "square feet" and another predicted unit of measurement may be "square foot." Unlike the example above, where the predicted units of measurement may be given a similarity value of one because the predicted units of measurement may not match, here a similarity value of between zero and one may be given to show how similar or dissimilar the predicted units of measurement may be. In some embodiments, a text normalization process may be implemented to increase the accuracy of comparing the predicted units of measurement. In the example above, one predicted unit of measurement was "square feet" and another predicted unit of measurement was "square foot." Continuing the example, the predicted units of measurement may be different in that "feet" may different from "foot" but practically, there may be no difference. Continuing the example, the text normalization process may allow for a more accurate unit similarity value by identifying and normalizing certain textual terms to be consistent with each other (e.g., foot and feet both become feet). In these and other embodiments, a predicted unit similarity value approaching zero may illustrate that the predicted units of measurement may be more similar than dissimilar while a predicted unit similarity value approaching one may illustrate that the predicted units of measurement may be more dissimilar than similar.

At block 614, a determination may be made as to whether other pairs of columns may be available to compare from the dataset. In some embodiments, the dataset may include a number of columns where each of the number of columns may be compared to each of the other columns in the number of columns. If no other pairs of columns to compare in the dataset, the method 600 may proceed to the block 616, where the method 600 may end. If yes, the method 600 may return to the blocks 602 and 606 where a first column and a second column may be selected for comparison.

Modifications, additions, or omissions may be made to the method 600 without departing from the scope of the present disclosure. For example, the operations of method 600 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described embodiments.

Figure 7:
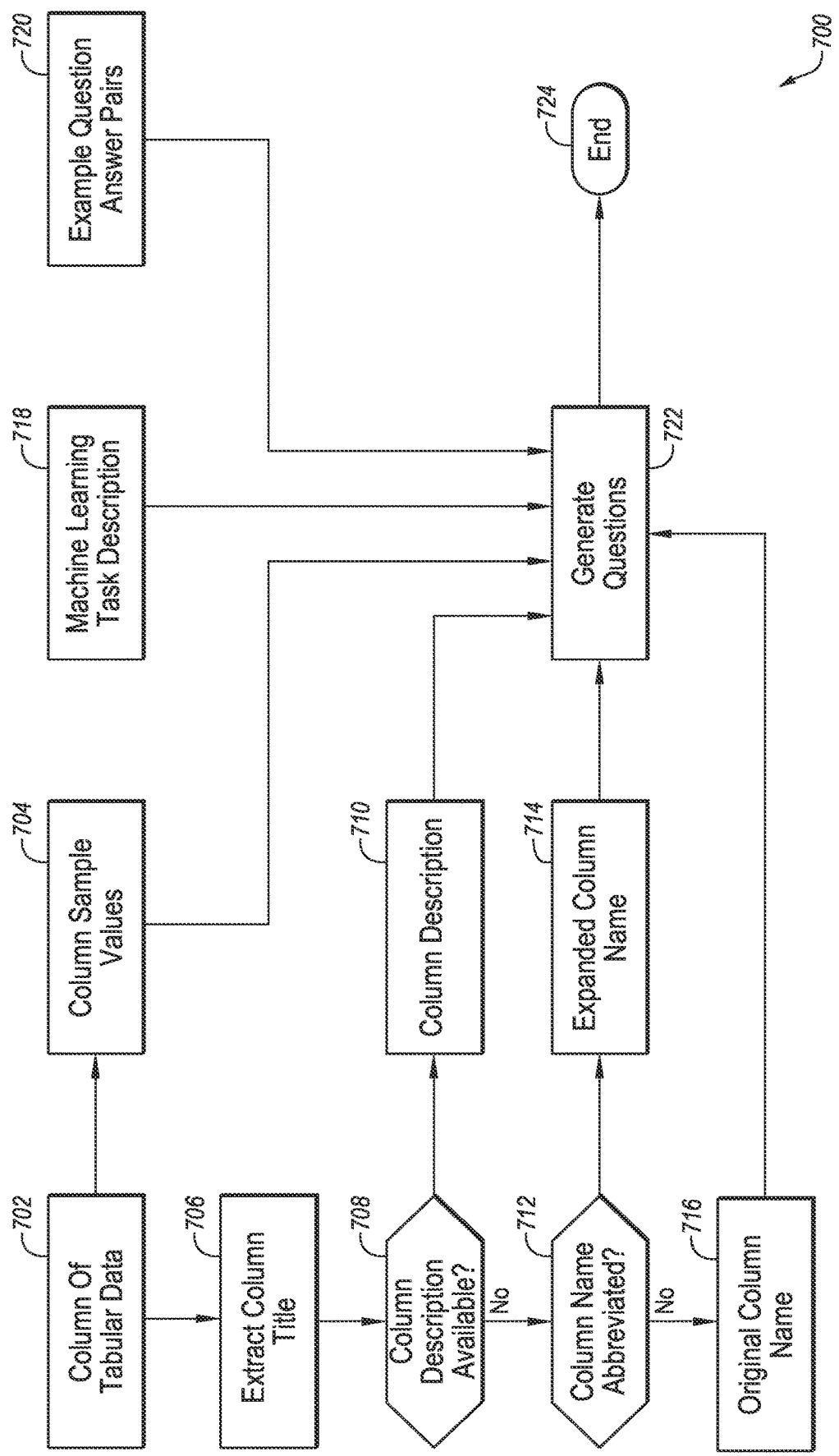
FIG. 7 illustrates a flowchart of an example method of generating a number of questions for a language model.

FIG. 7 illustrates a flowchart of an example method 700 of generating a number of questions for the language model, in accordance with at least one embodiment described in the present disclosure. The method 700 may be performed by any suitable system, apparatus, or device with respect to the feature engineering system 100 of FIG. 1, the unit similarity module 250 in FIG. 2, and the system 200 in FIG. 2. The method 700 may include one or more blocks 702, 704, 706, 708, 710, 712, 714, 716, 718, 720, 722, and 724. Although illustrated with discrete blocks, the steps and operations associated with one or more of the blocks of the method 700 may be divided into additional blocks, combined into fewer blocks, or eliminated, depending on the particular implementation.

In some embodiments, the method 700 may start at block 702. At block 702, a column may be extracted from tabular data. In some embodiments, the tabular data may include a dataset that may be separated into any number of columns where the columns may each include a title and/or value(s).

At block 704, sample values may be extracted from the columns. In some embodiments, the column may include values from which sample values may be extracted. For example, the column may include 1,500 total values and, from those 1,500 values, five sample values may be extracted and may be used to synthesize one question for each of the five sample values. Continuing the example, the five sample values may be randomly selected. Additionally or alternatively, the five sample values may be the five most common values in the column. Further continuing the example, each of the five sample values selected may include different sample values such that the questions synthesized may include different sample values. Continuing the example, the five sample questions may be drafted to elicit five answers that may each include a predicted unit of measurement. Further continuing the example, each of the five questions synthesized may be sent to a language model that may be trained to answer the five questions with five corresponding answers, each of the five answers may include a predicted unit of measurement.

At block 706, a column title may be extracted. In some embodiments, each of columns may have a title and each title from each of the columns may be extracted.

At block 708, a determination may be made as to whether a column description may be available. In some embodiments, one or more of the columns in the dataset may include a column description that may provide additional information regarding a meaning of variables, titles, values, and other components of the columns in the dataset. The column description may provide additional context with which the questions for the language model may be synthesized. If the column description is available, the method 700 may proceed to block 710. If the column description is not available, the method 700 may proceed to block 712.

At block 710, based on the column description being available, the column description may be extracted such that the column descriptions may be used to facilitate generation of questions. In these and other embodiments, the column description may provide context for the given column. For example, a column may include a title which may be an abbreviated title: "OveralQual." The column may additionally include a column description where the column description explains, for example, that the first title "OveralQual" may describe "Overall material and finish quality." The column description, continuing the example, may be used in the method 700 to generate questions that may include additional context, such as an explanation for the abbreviated title "OveralQual" in the column. In some embodiments, the column description may be used to generate the number of questions instead of the title in the column, or may be used in conjunction with the title in the column.

At block 712, a determination may be made as to whether the column name may be abbreviated. In some embodiments, the column name may be abbreviated in the dataset for a variety of reasons including efficiency, space used, etc. In these and other embodiments, it may be determined that the column name may be abbreviated. For example, the column name may be "GrgeYrBlt" which may be an abbreviated form of "Garage Year Built." If the column name is abbreviated, the method 700 may proceed to block 714. If the column name is not abbreviated, the method 700 may proceed to block 716.

At block 714, the column name may be expanded. To use the above example at block 712, the column name may be "GrgeYrBlt," which may be automatically expanded to be "Garage Year Built." In some embodiments, the expanded column name may be used to generate questions at block 722 where the expanded column name may be used to provide additional information and additional context with which the language model generates an answer that may provide a basis for a predicted unit of measurement for the values in the associated column.

At block 716, the original column name may be used. In some embodiments, the column name may be determined to be abbreviated at block 712 but may also not have an identifiable expanded name and, in such a circumstance, the original column name may be used to generate questions at block 722. For example, the column name may be "Xlt" which may be an abbreviated column name, but an expanded version of the abbreviated column name may not be readily identifiable. In that instance, "Xlt" may be used to generate questions at block 722.

At block 718, a machine learning task description may be identified. In some embodiments, an improved dataset with additional features as a result of the methods described in FIGS. 3-7 and illustrated as systems in FIGS. 1, 2, and 10 may be used to train a machine learning model to complete a task more quickly, effectively, and/or efficiently. In some embodiments, the task or target description of the machine learning problem may be known. In these and other embodiments, the known task or target description may be used to generate a question drafted to elicit an answer of a predicted unit of measurement that may be targeted to completing the known task. For example, the task description for the machine learning model may be to "predict residential housing price" and a column name in the dataset may be "GarageArea." Further continuing the example, the question generated may include the machine learning task as context: "to predict the residential housing price, what is the unit of GarageArea?" In some embodiments, the additional context provided as a result of using the known task description may increase the ability of the language model to accurately predict a unit of measurement for the values in the first column.

At block 720, example question-answer pairs may be generated. In some embodiments, the example question-answer pairs may be generated to provide examples to the language model such that the language model may be able to more readily and accurately answer the questions generated at block 722. In some embodiments, the question-answer pairs may include different units. In some embodiments, the question-answer pairs may include the same units. For example, the number of question-answer pairs generated may include the following:

Question 1: To predict telescope class, the fDist is 333.0607. What is the unit of fDist?
Answer 1: millimeter
Question 2: To predict quake, the latitude is −32.98. What is the unit of latitude?
Answer 2: degree
Question 3: To predict minerals, the Mohs hardness is 4.5. What is the unit of Mohs?
Answer 3: ordinal scale In some embodiments, the question-answer pairs may be sent to a language model with the questions generated at block 722 to provide context for the language model to predict a unit of measurement. In these and other embodiments, the question-answer pairs may be used independently to train the language model. Additionally or alternatively, the question-answer pairs may be used to fine-tune the language model such that it may more accurately and efficiently predict units of measurement. In these and other embodiments, the question-answer pairs may be generated with a same style and/or in a similar format as the questions generated at block 722. In some embodiments, the question-answer pairs may include known question-answer pairs prepared by a user (such as a data scientist or computer programmer) with a known question and a known correct answer.

At block 722, questions may be generated. In some embodiments, the questions generated may be generated based on one or more of the column sample values extracted at block 704, the column description at block 710, the expanded column name at block 714, the original column name at block 716, the machine learning task description at block 718, and the question-answer pairs generated at block 720.

For example, the questions generated may be generated to send to the language model in a form like the following:

[question-answer example(s)]. To predict [machine learning task description], [the column description or the expanded column name or the original column name] is [sample value]. What is the unit of [the column description or the expanded column name or the original column name]?

or by way of example when the above template is filled in:

To predict residential housing value, Basement Square Feet is 1,005. What is the unit of Basement Square Feet?

At block 724, the method 700 used to generate questions to send to the language model may end.

Modifications, additions, or omissions may be made to the method 700 without departing from the scope of the present disclosure. For example, the operations of method 700 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described embodiments.

Figure 8:
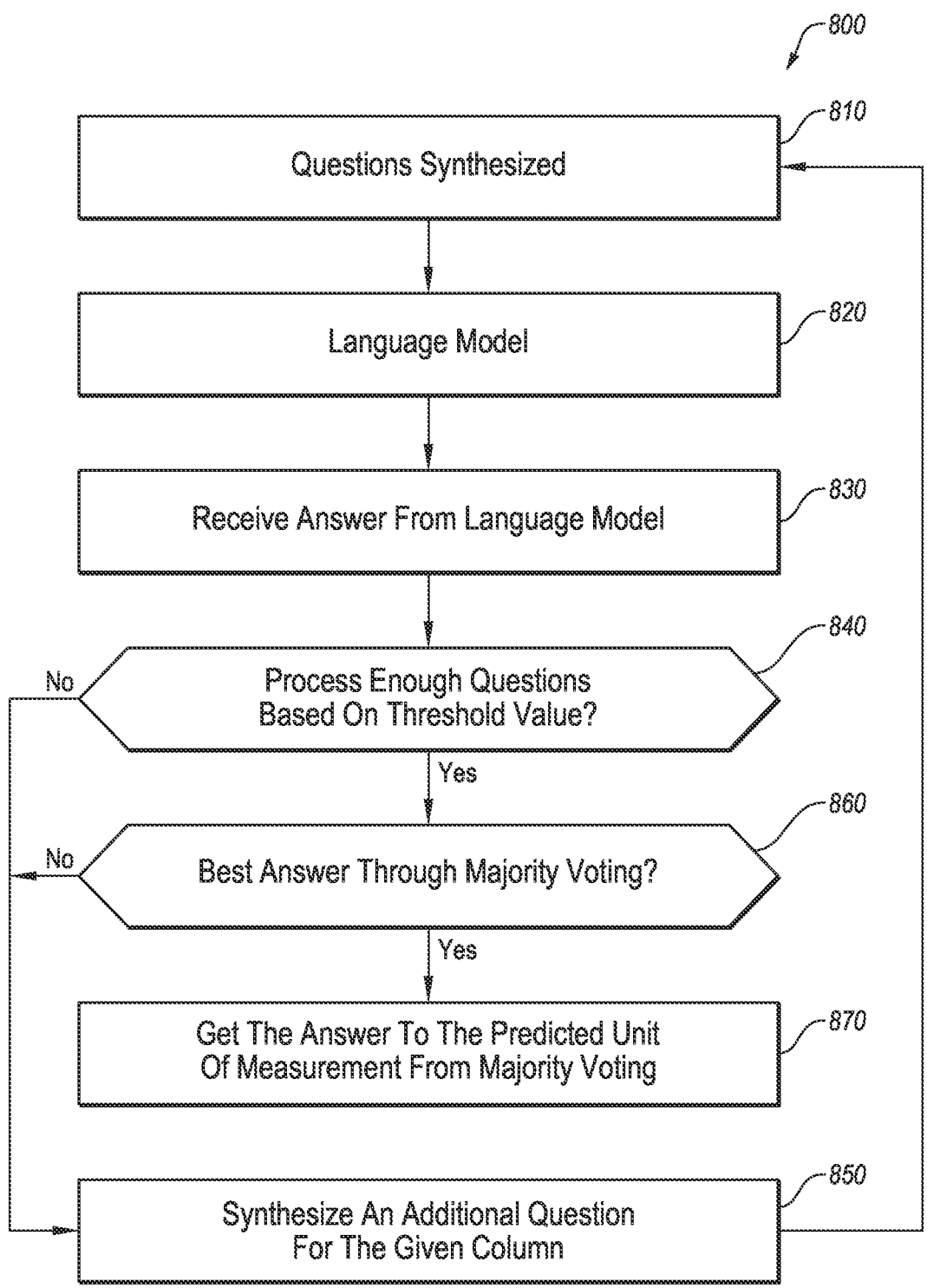
FIG. 8 illustrates a flowchart of an example method of determining a predicted unit of measurement via majority voting.

FIG. 8 illustrates a flowchart of an example method 800 of determining the predicted unit of measurement via majority voting, in accordance with at least one embodiment described in the present disclosure. The method 800 may be performed by any suitable system, apparatus, or device with respect to the feature engineering system 100 of FIG. 1, the unit similarity module 250 in FIG. 2, and the system 200 in FIG. 2. For example, the feature engineering system 100 of FIG. 1 and the system 200 of FIG. 2. The method 800 may include one or more blocks 810, 820, 830, 840, 850, 860, and 870. Although illustrated with discrete blocks, the steps and operations associated with one or more of the blocks of the method 800 may be divided into additional blocks, combined into fewer blocks, or eliminated, depending on the particular implementation.

In some embodiments, the method 800 may start at block 810. At block 810, questions may be synthesized. In some embodiments, the questions synthesized may be the same questions as those generated in method 700 (e.g., at block 722). In some embodiments, the questions synthesized may be based on a number of sample values extracted from a column. In these and other embodiments, the questions synthesized may be configured to be sent to a language model and may be drafted to elicit an answer from the language model where the answer from the language model may be used to generate a predicted unit of measurement for the column.

At block 820, the language model may be configured to receive the questions synthesized. In some embodiments, the language model may be configured to answer each of the questions synthesized where the answer to each of the questions synthesized may include a unit of measurement. In some embodiments the dataset may include columns where questions may be synthesized for each of the columns to predict a unit of measurement for values in each of the columns. In these and other embodiments, the language model may include language models as described and illustrated above in FIG. 5.

At block 830, the answers may be received from the language model. In some embodiments, each of the questions may be drafted to elicit an answer that includes a unit of measurement.

At block 840, a determination may be made as to whether enough questions have been answered by the language model. In some embodiments, whether the number of questions answered is enough may be based on a threshold number of questions. In some embodiments the threshold number of questions may be based on a number of values in the first column. In some embodiments, the threshold number of questions may be based on a determined effectiveness of the language model. For example, if the language model has been proven to provide an answer that includes a correct predicted unit of measurement at a rate of 50%, the threshold number of questions may be higher than a language model that has proven to provide an answer that includes a correct predicted unit of measurement at a rate of 80%. In some embodiments, the threshold number of questions may be determined based on using a majority vote method of determining a predicted unit of measurement. In some embodiments, the language model may provide several different answers (e.g. for questions with different sample values) and the predicted unit of measurement may be selected based on a majority agreement of the several answers given from the language model. In some embodiments, a number of answers to achieve the best answer may be predefined. In some embodiments, the predefined number of answers to achieve the best answer may indicate a corresponding number of questions that may be synthesized and answered by the language model. By way of example and not limitation, the predefined number of answers to achieve the best answer may be three. Continuing the example, the corresponding number of questions that may be synthesized and answered by the language model may be three to five questions. If enough questions have been processed, the method 800 may proceed to block 860. If not, the method 800 may proceed to block 850.

At block 850, an additional question may be synthesized to send to the language model. In these and other embodiments, the additional question synthesized may be synthesized using a different sample value than the sample values that may have already been used to synthesize the questions that may have been sent to the language model. For example, a first question synthesized based on a first sample value from the first column and a second question synthesized based on a second sample value from the first column may have been sent to the language model. Further continuing the example, an additional question may be synthesized where the additional question may be generated based on a third sample value from the first column.

At block 860, a determination may be made as to whether a best answer has been provided through the majority vote method. In some embodiments, the best answer may be provided through the majority vote method if a majority of the answers provided by the language model agree. For example, one of the questions synthesized may be "what is the unit of measurement for Price per Square Foot?" Continuing the example, three answers may be provided by the language model: "dollar," "square feet," and "dollar." Because there is a majority answer (e.g., "dollar"), enough questions may have been answered by the language model. As another example, five answers may be provided by the language model and three answers of the five answers may include "dollars" as the predicted unit of measurement. Continuing the example, because "dollars" may be a majority answer, the determination may be made in the affirmative that the best answer had been provided through the majority vote method. If there is a best answer, the method 800 may proceed to the block 870. If there is not a best answer, the method 800 may proceed to the block 850 to synthesize an additional question.

At block 870, the best answer may be determined based on the majority vote method. As discussed and illustrated at the blocks 840, 850, and 860 above, the language model may provide an answer to each of the number of questions synthesized such that there may be several answers corresponding to the questions. In some embodiments, a majority of the answers provided by the language model may be the same and, in that instance, the answer for the predicted unit of measurement may be the majority of the answers provided by the language model.

Modifications, additions, or omissions may be made to the method 800 without departing from the scope of the present disclosure. For example, the operations of method 800 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described embodiments.

FIG. 9 illustrates a flowchart of an example method 900 of generating a new column with new values to add to the dataset, in accordance with at least one embodiment described in the present disclosure. The method 900 may be performed by any suitable system, apparatus, or device with respect to the feature engineering system 100 of FIG. 1, the cluster module 260 in FIG. 2, and the system 200 in FIG. 2. For example, the feature engineering system 100 of FIG. 1 and the system 200 of FIG. 2. The method 900 may include one or more blocks 910, 920, 930, 940, and 950. Although illustrated with discrete blocks, the steps and operations associated with one or more of the blocks of the method 900 may be divided into additional blocks In some embodiments, the method 900 may start at block 910. At block 910, a dataset may be obtained that may have columns where each column may include a title and value(s) in each of the columns.

At block 920, a total similarity value may be determined between pairs of columns. In some embodiments, the columns may be compared in pairs of columns where each may be compared to each of the other columns in the dataset. In some embodiments, a column in the dataset may be compared to another column in the dataset to determine the total similarity value between the pair of columns. In some embodiments, the total similarity value may be based on at least one of the metadata similarity value, the semantic similarity value, and the unit similarity value. Additionally or alternatively, the total similarity value may be based on all three of the metadata similarity value, the semantic similarity value, and the unit similarity value. In some embodiments, the metadata similarity value may be determined and obtained as illustrated and described in FIGS. 2, 3A, and/or 3B. In these and other embodiments, the semantic similarity value may be determined and obtained as illustrated and described in FIGS. 2 and/or 4. Additionally or alternatively, the unit similarity value may be determined and obtained as illustrated and described in FIGS. 2, and/or 5-8. In some embodiments, the total similarity value may be determined by adding each of the metadata similarity value, the semantic similarity value, and the unit similarity value together. For example, the metadata similarity value may be 0.25, the semantic similarity value may be 1.0 and the unit similarity value may be 0.75 and therefore the total similarity value may be 2.0. Additionally or alternatively, the total similarity value may include averaging the respective similarity values, using a weighted average, or any other combinatorial technique.

At block 930, the columns may be added to a cluster based on the total similarity value. In some embodiments, each of the columns may be added to the cluster based on the total similarity values between each of the pairs of columns in the dataset. Additionally or alternatively, once the total similarity value may be determined for each of the pairs of columns in the dataset, each of the columns may be added to the cluster based on a threshold similarity value. For example, the total similarity value between the first column and the second column may be 2.0 as described above, and the threshold similarity value may be 3.0. Further continuing the example, because 2.0 may be less than 3.0, the first column and the second column may be added to the cluster. Additionally or alternatively, the threshold similarity value may be based on an nth smallest distance between all of the columns in the dataset. In some embodiments, the columns may be clustered based on the nth smallest distance between the other columns in the dataset where "n" may be any number of values. Additionally or alternatively, the columns in the dataset may be clustered using a K-means clustering method or a K Nearest Neighbor Clustering method where K may be any number of values (e.g., 1, 2, 3, etc.). Additionally or alternatively, the columns may be clustered using any number of different clustering methods where the columns may be clustered based on the total similarity value between columns.

At block 940, a new column may be generated using a feature engineering function. In some embodiments, the new column may be added to the cluster. In some embodiments, the first cluster may include first values in a first column and second values in a second column. The feature engineering function may generate new values in the new column by performing a mathematical operation on at least the first values. In some embodiments, the feature engineering function may generate the new values by performing a mathematical operation on both the values in the first column and the values in the second column. For example, the feature engineering function may add, subtract, divide, multiply, or use any other mathematical function that may create the new values in the new column using the values in the first column and/or the values in the second column. By way of example, the values in the first column may illustrate "finished household square feet" and the values in the second column may illustrate "unfinished household square feet." Continuing the example, the first column may be clustered together with the second column, and the feature engineering function may create new values in a new column of "total household square feet." In this example, the feature engineering function may create the new values by adding the values in the first column to the values in the second column. Continuing the example, the new column may then be clustered together with the first column and the second column.

At block 950, the new column may be added to the dataset. In some embodiments, the dataset may be used to train a machine learning system. Additionally or alternatively, the dataset including the new column may be used in a machine learning pipeline where a number of machine learning systems may be trained.

Modifications, additions, or omissions may be made to the method 900 without departing from the scope of the present disclosure. For example, the operations of method 900 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described embodiments.

Figure 10:
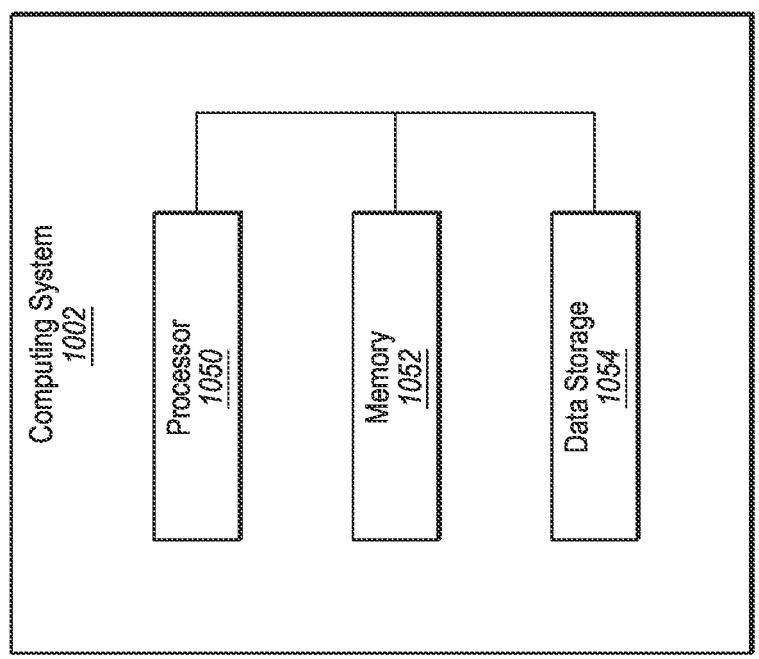
FIG. 10 illustrates a block diagram of an example computing system, all arranged in accordance with some embodiments of the present disclosure.

FIG. 10 illustrates a block diagram of an example computing system 1002, according to at least one embodiment of the present disclosure. The computing system 1002 may be configured to implement or direct one or more suitable operations described in the present disclosure. For example, the computing system 1002 may be used in various elements of the above disclosure (e.g., feature engineering system 120, machine learning system 140, and feature engineering system 260, or other systems capable of performing one or more operations or actions in the disclosed embodiments). In some embodiments, the computing system 1002 may be used to control operations related to generating a new column for a new dataset. In these and other embodiments, the computing system 1002 may be used to train a machine learning model using the new dataset. The computing system 1002 may include a processor 1050, a memory 1052, and a data storage 1054. The processor 1050, the memory 1052, and the data storage 1054 may be communicatively coupled.

In general, the processor 1050 may include any suitable computer, computing entity, or processing device including various computer hardware or software modules and may be configured to execute instructions stored on any applicable computer-readable storage media. For example, the processor 1050 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 10, the processor 1050 may include any number of processors configured to, individually or collectively, perform or direct performance of any number of operations described in the present disclosure. Additionally, one or more of the processors may be present on one or more different electronic devices, such as different servers.

In some embodiments, the processor 1050 may be configured to interpret and/or execute program instructions and/or process data stored in the memory 1052, the data storage 1054, or the memory 1052 and the data storage 1054. In some embodiments, the processor 1050 may fetch program instructions from the data storage 1054 and load the program instructions in the memory 1052. After the program instructions are loaded into memory 1052, the processor 1050 may execute the program instructions.

The memory 1052 and the data storage 1054 may include computer-readable storage media for carrying or having computer-executable instructions or data structures stored thereon. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other non-transitory storage medium which may be used to store particular program code in the form of computer-executable instructions or data structures and which may be accessed by a general-purpose or special-purpose computer. In these and other embodiments, the term "non-transitory" as explained in the present disclosure should be construed to exclude only those types of transitory media that were found to fall outside the scope of patentable subject matter in the Federal Circuit decision of *In re Nuijten,* 500 F.3d 1346 (Fed. Cir. 2007).

Combinations of the above may also be included within the scope of computer-readable storage media. Computer-executable instructions may include, for example, instructions and data configured to cause the processor 1050 to perform a certain operation or group of operations.

Modifications, additions, or omissions may be made to the computing system 1002 without departing from the scope of the present disclosure. For example, in some embodiments, the computing system 1002 may include any number of other components that may not be explicitly illustrated or described.

Embodiments described in the present disclosure may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data, which cause a general-purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

As used in the present disclosure, terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

We claim:

1. A method, comprising:
    obtaining a dataset having one or more columns, each of the one or more columns includes a title and at least one value;
    obtaining a task description corresponding to a machine learning model to be trained using the dataset;
    extracting, for each of the one or more columns, the title and a sample value lacking a corresponding unit of measurement from the at least one value;
    synthesizing a question to elicit, from a language model, an answer indicating a predicted unit of measurement predicting the corresponding unit of measurement associated with the sample value from each of the one or more columns, the question synthesized based on:
        the title for each of the one or more columns;
        the sample value for each of the one or more columns; and
        the task description corresponding to the machine learning model to be trained using the dataset;
    sending the question to the language model to obtain an answer; and
    generating from the answer to the question, the predicted unit of measurement for the at least one value in each of the one or more columns;
    adding the predicted unit of measurement to the at least one value in each of the one or more columns in the dataset; and
    training the machine learning model using the dataset including the added predicted unit of measurement.

2. The method of claim 1, further comprising, prior to synthesizing the question for each of the one or more columns, expanding the title from each of the one or more columns.

3. The method of claim 1, wherein a number of sample values are extracted for each of the one or more columns and a number of questions are synthesized, the number of questions synthesized is determined based on a predefined minimum threshold value.

4. The method of claim 1, further comprising, prior to sending the question to a language model, training the language model by sending at least one question-answer pair to the language model, including:
    an example question drafted to elicit an example answer that includes an example unit of measurement; and
    the example answer including the example unit of measurement.

5. The method of claim 1, wherein at least three questions are synthesized; and
    wherein the predicted unit of measurement is generated by selecting a majority answer from at least three answers received from the language model.

6. The method of claim 1, further comprising:
    determining a similarity value between the one or more columns in the dataset based on the predicted unit of measurement;
    generating a cluster including the one or more columns in the dataset if the similarity value is greater than a threshold value;
    generating a new column including a new title and at least one new value to add to the cluster using a feature engineering function;
    adding the new column including the new title and the at least one new value to the dataset; and
    training a machine learning model using the dataset including the new column.

7. One or more non-transitory computer-readable storage media configured to store instructions that, in response to being executed, cause a system to perform operations, the operations comprising:
  obtaining a dataset having one or more columns, each of the one or more columns includes a title and at least one value;
  obtaining a task description corresponding to a machine learning model to be trained using the dataset;
  extracting, for each of the one or more columns, the title and a sample value lacking a corresponding unit of measurement from the at least one value;
  synthesizing a question to elicit, from a language model, an answer indicating a predicted unit of measurement predicting the corresponding unit of measurement associated with the sample value from each of the one or more columns, the question synthesized based on:
    the title for each of the one or more columns;
    the sample value for each of the one or more columns; and
    the task description corresponding to the machine learning model to be trained using the dataset;
  sending the question to the language model to obtain an answer; and
  generating from the answer to the question, the predicted unit of measurement for the at least one value in each of the one or more columns
  adding the predicted unit of measurement to the at least one value in each of the one or more columns in the dataset; and
  training a machine learning model using the dataset including the added predicted unit of measurement.

8. The one or more non-transitory computer-readable storage media of claim 7, further comprising, prior to synthesizing the question for each of the one or more columns, expanding the title from each of the one or more columns.

9. The one or more non-transitory computer-readable storage media of claim 7, wherein a number of sample values are extracted for each of the one or more columns and a number of questions are synthesized, the number of questions synthesized is determined based on a predefined minimum threshold value.

10. The one or more non-transitory computer-readable storage media of claim 7, further comprising, prior to sending the question to a language model, training the language model by sending at least one question answer pair to the language model, the question answer pair including an example question drafted to elicit an example answer that includes an example unit of measurement and the example answer including the example unit of measurement.

11. The one or more non-transitory computer-readable storage media of claim 7, wherein at least three questions are synthesized; and
  wherein the predicted unit of measurement is generated by selecting a majority answer from at least three answers received from the language model.

12. The one or more non-transitory computer-readable storage media of claim 7, further comprising:
  determining a similarity value between the one or more columns in the dataset based on the predicted unit of measurement;
  generating a cluster including the one or more columns in the dataset if the similarity value is greater than a threshold value;
  generating a new column including a new title and at least one new value to add to the cluster using a feature engineering function;
  adding the new column including the new title and the at least one new value to the dataset; and
  training a machine learning model using the dataset including the new column.

13. A system comprising:
one or more processors; and
one or more non-transitory computer-readable storage media configured to store instructions that, in response to being executed, cause the system to perform operations, the operations comprising:
  obtaining a dataset having one or more columns, each of the one or more columns includes a title and at least one value;
  obtaining a task description corresponding to a machine learning model to be trained using the dataset;
  extracting, for each of the one or more columns, the title and a sample value lacking a corresponding unit of measurement from the at least one value;
  synthesizing a question to elicit, from a language model, an answer indicating a predicted unit of measurement predicting the corresponding unit of measurement associated with the sample value from each of the one or more columns, the question synthesized based on:
    the title for each of the one or more columns;
    the sample value for each of the one or more columns; and
    a task description corresponding to a machine learning model to be trained using the dataset;
  sending the question to the language model to obtain an answer; and
  generating from the answer to the question, the predicted unit of measurement for the at least one value in each of the one or more columns
  adding the predicted unit of measurement to the at least one value in each of the one or more columns in the dataset; and
  training the machine learning model corresponding to the task description using the dataset including the added predicted unit of measurement.

14. The system of claim 13, wherein a number of sample values are extracted for each of the one or more columns and a number of questions are synthesized, the number of questions synthesized is determined based on a predefined minimum threshold value.

15. The system of claim 13, further comprising, prior to sending the question to a language model, training the language model by sending at least one question answer pair to the language model, the question answer pair including an example question drafted to elicit an example answer that includes an example unit of measurement and the example answer including the example unit of measurement.

16. The system of claim 13, wherein at least three questions are synthesized; and
  wherein the predicted unit of measurement is generated by selecting a majority answer from at least three answers received from the language model.

17. The system of claim 13, further comprising:
  determining a similarity value between the one or more columns in the dataset based on the predicted unit of measurement;
  generating a cluster including the one or more columns in the dataset if the similarity value is greater than a threshold value;

generating a new column including a new title and at least one new value to add to the cluster using a feature engineering function;

adding the new column including the new title and the at least one new value to the dataset; and training a machine learning model using the dataset including the new column.

\* \* \* \* \*